United States Patent
Hennig et al.

(10) Patent No.: US 12,183,350 B2
(45) Date of Patent: Dec. 31, 2024

(54) ADVERSARIALLY ROBUST VOICE BIOMETRICS, SECURE RECOGNITION, AND IDENTIFICATION

(71) Applicant: PayPal, Inc., San Jose, CA (US)

(72) Inventors: Karl Anton Hennig, Campbell, CA (US); Ajay Aswal, Fremont, CA (US); Bisrat Zerihun, San Jose, CA (US)

(73) Assignee: PayPal, Inc., San Jose, CA (US)

(*) Notice: Subject to any disclaimer, the term of this patent is extended or adjusted under 35 U.S.C. 154(b) by 667 days.

(21) Appl. No.: 17/227,710

(22) Filed: Apr. 12, 2021

(65) Prior Publication Data
US 2022/0328050 A1 Oct. 13, 2022

(51) Int. Cl.
| | | |
|---|---|---|
| G10L 17/24 | (2013.01) | |
| G06F 21/32 | (2013.01) | |
| G10L 17/06 | (2013.01) | |
| G10L 17/08 | (2013.01) | |
| G10L 17/22 | (2013.01) | |
| H04L 9/40 | (2022.01) | |

(Continued)

(52) U.S. Cl.
CPC ............. *G10L 17/24* (2013.01); *G06F 21/32* (2013.01); *G10L 17/06* (2013.01); *G10L 17/08* (2013.01); *G10L 17/22* (2013.01); *H04L 63/0861* (2013.01); *G06F 2221/2113* (2013.01); *G10L 17/04* (2013.01); *G10L 25/51* (2013.01)

(58) Field of Classification Search
CPC ......... G10L 17/24; G10L 17/06; G10L 17/08; G10L 17/22; G10L 17/04; G10L 25/51; G06F 21/32; G06F 2221/2113; H04L 63/0861

USPC .......................................................... 704/275
See application file for complete search history.

(56) References Cited

U.S. PATENT DOCUMENTS

| 9,183,836 | B2 * | 11/2015 | Daye .................... G10L 17/20 |
| 9,824,692 | B1 * | 11/2017 | Khoury ................ G10L 17/02 |
| 10,623,403 | B1 * | 4/2020 | Gupta ................ H04M 3/5166 |

(Continued)

OTHER PUBLICATIONS

"Five9 IVR with Advanced Speech Recognition," https://www.five9.com/landing/interactive-voice-response-ivr, accessed Jul. 21, 2021, 12 pages.

(Continued)

*Primary Examiner* — Edwin S Leland, III
(74) *Attorney, Agent, or Firm* — Greenberg Traurig, LLP

(57) ABSTRACT

Techniques for detecting a fraudulent attempt by an adversarial user to voice verify as a user are presented. An authenticator component can determine characteristics of voice information received in connection with a user account based on analysis of the voice information. In response to determining the characteristics sufficiently match characteristics of a voice print associated with the user account, authenticator component can determine a similarity score based on comparing the characteristics of the voice information and other characteristics of a set of previously stored voice prints associated with the user account. Authenticator component can determine whether the similarity score is higher than a threshold similarity score to indicate whether the voice information is a replay of a recording or a deep fake emulation of the voice of the user. Above the threshold can indicate the voice information is fraudulent, and below the threshold can indicate the voice information is valid.

20 Claims, 7 Drawing Sheets

(51) Int. Cl.
*G10L 17/04* (2013.01)
*G10L 25/51* (2013.01)

(56) References Cited

U.S. PATENT DOCUMENTS

| | | | | |
|---|---|---|---|---|
| 10,665,238 | B1* | 5/2020 | Bermudez-Cisneros | ............... G06F 3/167 |
| 10,693,872 | B1* | 6/2020 | Larson | ............... H04L 9/3231 |
| 10,979,423 | B1* | 4/2021 | Garner, IV | ............ H04L 67/306 |
| 11,657,096 | B2* | 5/2023 | Hennig | ............... H04L 51/216 704/9 |
| 2009/0083841 | A1* | 3/2009 | Gierach | ............... H04L 9/3231 726/7 |
| 2013/0047232 | A1* | 2/2013 | Tuchman | ......... G06Q 20/40145 726/7 |
| 2015/0067822 | A1* | 3/2015 | Randall | ................ G06F 21/32 726/17 |
| 2015/0249664 | A1* | 9/2015 | Talhami | .............. H04L 63/0861 726/6 |
| 2018/0018973 | A1* | 1/2018 | Moreno | ................ G10L 17/02 |
| 2018/0077131 | A1* | 3/2018 | Averboch | ............ H04L 63/0884 |
| 2018/0082689 | A1* | 3/2018 | Khoury | ................ G10L 17/08 |
| 2018/0201226 | A1* | 7/2018 | Falkson | ................ B60R 25/257 |
| 2018/0226079 | A1* | 8/2018 | Khoury | ................ G06F 21/32 |
| 2018/0240463 | A1* | 8/2018 | Perotti | ................ G10L 17/22 |
| 2018/0366128 | A1* | 12/2018 | Liu | ........... G10L 17/22 |
| 2019/0394195 | A1* | 12/2019 | Chari | ................ H04L 63/08 |
| 2020/0043471 | A1* | 2/2020 | Ma | ........... G10L 15/07 |
| 2020/0211571 | A1* | 7/2020 | Shoa | ................ G10L 17/22 |
| 2020/0366671 | A1* | 11/2020 | Larson | ................ G06F 9/451 |
| 2021/0125619 | A1* | 4/2021 | López Espejo | ......... G10L 17/04 |
| 2021/0233541 | A1* | 7/2021 | Chen | ................ G10L 17/08 |
| 2021/0390959 | A1* | 12/2021 | Jain | ................ A61B 5/7267 |
| 2022/0197952 | A1* | 6/2022 | Hennig | ................ H04L 51/216 |
| 2022/0246153 | A1* | 8/2022 | Frenkel | ................ G10L 17/04 |
| 2022/0277062 | A1* | 9/2022 | Simonchik | .............. G10L 17/22 |
| 2022/0328050 | A1* | 10/2022 | Hennig | ................ G10L 17/24 |
| 2023/0325442 | A1* | 10/2023 | Hennig | ............... G06F 16/9035 704/9 |

OTHER PUBLICATIONS

"Voice Authentication," https://www.aware.com/voice-authentication/, accessed Jul. 21, 2021, 3 pages.

"Nuance—Biometric authentication technology—Authenticate customers with biometrics," https://www.nuance.com/omni-channel-customer-engagement/security/identification-and-verification.html, accessed Jul. 21, 2021, 8 pages.

"HYPR—Encyclopedia—Voice Authentication—Security Encyclopedia," https://www.hypr.com/voice-authentication/, accessed Jul. 21, 2021, 4 pages.

Sivakumar, "Voice Biometric Authentication Explained," Claysys, Call Centers, https://www.claysys.com/blog/voice-biometric-authentication/, Oct. 13, 2020, 4 pages.

* cited by examiner

ADVERSARIALLY ROBUST VOICE BIOMETRICS, SECURE RECOGNITION, AND IDENTIFICATION

TECHNICAL FIELD

The subject disclosure relates generally to electronic communications, e.g., to adversarially robust voice biometrics, secure recognition, and identification.

BACKGROUND

A service entity can desire to authenticate a user (e.g., subscriber or customer) by verifying the voice of the user, for example, when the user is attempting to access a user account, a service, an application, and/or content through a system of the service entity. An adversarial user sometimes can attempt to fraudulently authenticate, as the user, with the system of the service entity in attempt to access the user account of the user, or the service, application, or content that would be available to the user via the system of the entity upon authentication with the system.

There can be some conventional techniques for voice verification that may be able to identify a voice of an adversarial user, who is attempting to impersonate the user, as being fraudulent, and can deny authentication and system access to the adversarial user. However, in some instances, an adversarial user may have been able to obtain a recording of the voice of the user or may electronically create a deep fake voice that attempts to emulate the voice of the user, and may use the recording of the voice of the user or the deep fake voice to attempt to authenticate, as the user, with the system of the service entity, for instance, to access the user account of the user and/or services or information associated with the user. Conventional techniques for voice verification and user authentication can suffer from various deficiencies, including not being able to detect as fraudulent a recording of a voice of a user or a deep fake voice emulating the voice of the user when an adversarial user fraudulently attempts to use such recording or deep fake voice to fraudulently represent himself or herself as the user and authenticate with the system of the service entity.

Systems, methods, and/or techniques that can ameliorate one or more of these problems can be desirable.

DETAILED DESCRIPTION

Figure 1:
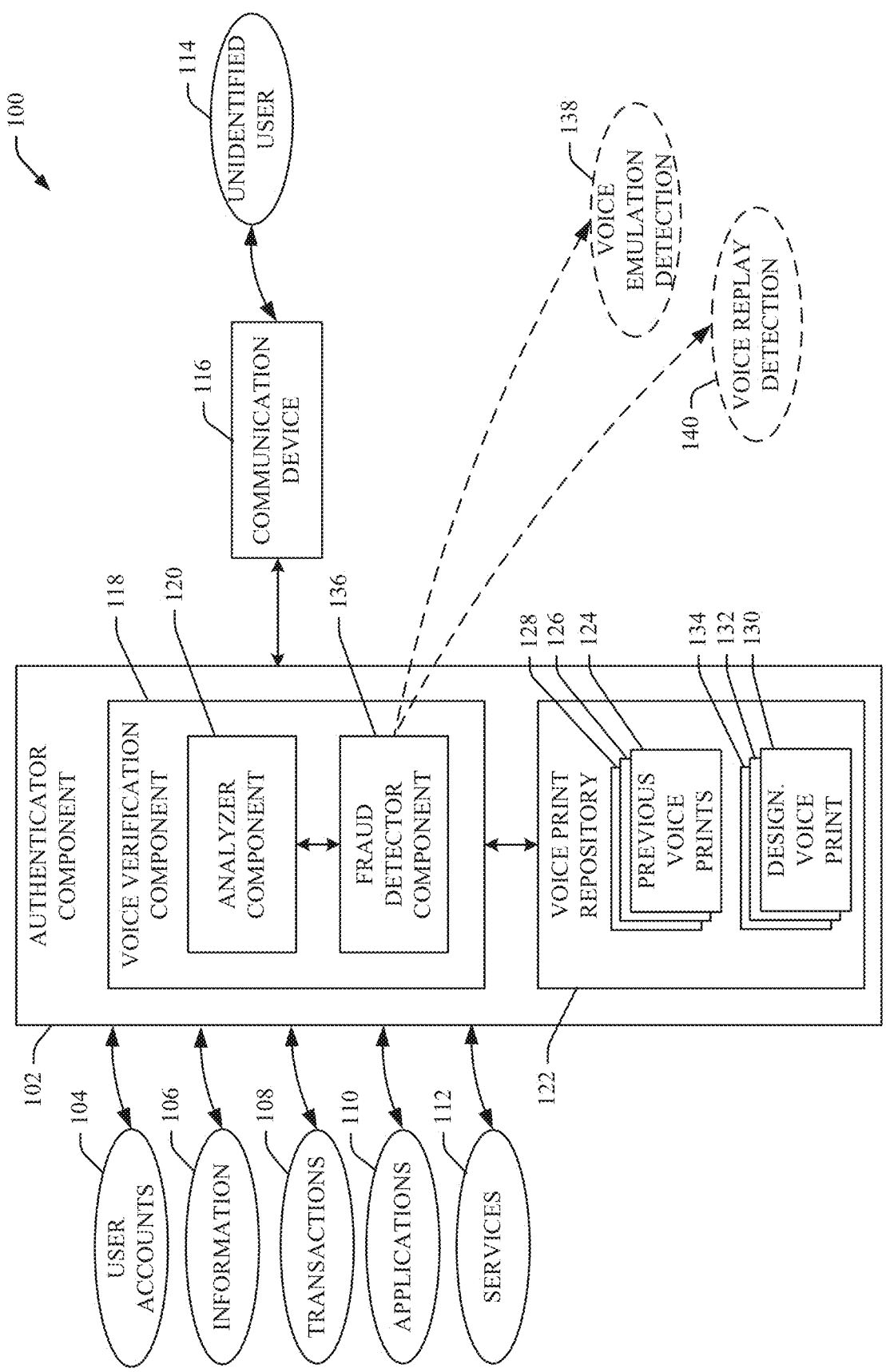
FIG. 1 illustrates a block diagram of an example, non-limiting system that can desirably perform authentication of voice information representative of a voice that is presented by an unidentified user to determine whether the voice information is a valid representation of the voice of a user associated with a user account or is fraudulent representation of the voice of the user, in accordance with various aspects and embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With regard to voice authentication and verification, there can be some conventional techniques for voice verification that may be able to identify a voice of an adversarial user, who is attempting to impersonate a user associated with a user account, as being fraudulent, and can deny authentication and deny access to the user account and system access to the adversarial user. However, in some instances, an adversarial user may have been able to obtain a recording of the voice of the user or may electronically create a deep fake voice that attempts to emulate the voice of the user, and may use the recording of the voice of the user or the deep fake voice to attempt to authenticate, as the user, with the system of the service entity to access the user account of the user and/or services or information associated with the user. Conventional techniques for voice verification and user authentication can suffer from various deficiencies, including not being able to detect as fraudulent a recording of a voice of a user or a deep fake voice emulating the voice of the user when an adversarial user fraudulently attempts to use such recording or deep fake voice to fraudulently represent himself or herself as the user and authenticate with the system of the service entity to access the user account of the user and/or services or information associated with the user.

Various embodiments of the disclosed subject matter can address one or more of these issues/problems by facilitating desirable (e.g., efficient, suitable, enhanced, robust, and/or optimal) authentication and verification of voices of users or other entities attempting to access user accounts and/or other services or information relating to users. One or more embodiments described herein include systems, computer-implemented methods, apparatus, and/or computer program products that can facilitate adversarially robust voice biometrics, secure recognition, and identification to authenticate and verify the voices of actual users associated with user accounts, and detect voice information (e.g., replay of recording of a voice of a user, or a deep fake voice that emulates the voice of the user) presented by adversarial users attempting to fraudulently access user accounts and deny such adversarial users access to the user accounts.

To that end, techniques for adversarially robust voice biometrics, secure recognition, and identification, including detecting a fraudulent attempt by an adversarial user to voice verify as a user, are presented. In connection with an attempt to access a user account of a user and/or services or information associated with the user, an authenticator component can receive voice information (e.g., voice information representative of a voice) from an unidentified user (e.g., an unknown, undetermined, or unverified user) in connection with a user account associated with a user. The unidentified user potentially can be the user associated with the user account, or potentially can be another user (e.g., adversarial or malicious user) attempting to gain unauthorized access to the user account associated with the user. The authenticator component can comprise a voice verification component that can analyze the voice information, and can determine a set of characteristics of the voice information based at least in part on the results of analyzing the voice information. The voice verification component can determine (e.g., calculate) a first voice resemblance score (e.g., a first similarity score) based at least in part on the result of comparing the set of characteristics of the voice information to a set of characteristics of a designated voice print (e.g., designated voice fingerprint, such as a golden voice fingerprint) associated with the user account, wherein the voice print can be determined to be representative of the voice of the user associated with the user account. The voice verification component can compare the first voice resemblance score to a first threshold voice resemblance score (e.g., first threshold similarity score) to determine whether the voice information is a sufficient match to the voice print to indicate (e.g., at least provide a preliminary indication) that the voice information is the voice of the user associated with the user account.

In response to determining that the first voice resemblance score satisfies (e.g., is above or higher than) the first threshold voice resemblance score, the voice verification component can determine a second voice resemblance score based on comparing the set of characteristics of the voice information to a set of characteristics associated with a set of previously stored voice prints associated with the user account, wherein the set of previously stored voice prints may be voice data of the user corresponding to previous interactions between the user and the system or a service representative of a service entity associated with the system (e.g., previous interactions such as previous authentication attempts, previous customer service related interactions, or other interactions between the user and the system) and further may be stored by the system. The voice verification component can compare the second voice resemblance score to a second threshold voice resemblance score (e.g., second threshold similarity score) to determine whether the voice information too closely matches one of the previously stored voice prints, which can indicate that the voice information is, or at least likely is, fraudulent as being, for example, an artificially created voice (e.g., deep fake voice) that emulates the voice of the user or a replay of a recording of the voice of the user. In one or more embodiments, the second threshold voice resemblance score may be a different threshold voice resemblance score than the first threshold voice resemblance score.

If the voice verification component determines that the second voice resemblance score does not satisfy (e.g., is not above or higher than) the second threshold voice resemblance score, the voice verification component can determine that the voice information is verified as being the actual voice (e.g., actual live voice) of the user associated with the user account, as opposed to being fraudulent. In response, the authenticator component can authenticate the user with regard to the user account, and the user can access the user account and/or services or information associated with the user account.

If, instead, the voice verification component determines that the second voice resemblance score satisfies (e.g., is above or higher than) the second threshold voice resemblance score, the voice verification component can determine that the voice information potentially can be fraudulent (such as potentially being a deep fake voice or a replay of a recording of the voice of the user) or may potentially utilize the determination to predict that the voice information is potentially fraudulent. In response, the authenticator component can determine that the unidentified user has been unable to be authenticated, and based on that, may decline to grant the unidentified user access to the user account and/or services or information associated with the user account. In other embodiments, rather than prevent the unidentified user from accessing the user account, information associated with the user account, a resource page (e.g., a requested resource page), or other resources provided by the system, the authenticator component may cause one or more remedial or step-up authentication actions to take place.

For instance, as another level of authentication, to attempt to determine whether the unidentified user actually is the user, the authenticator component can present a multilingual challenge to the unidentified user to have the unidentified user speak, read, or write a phrase or otherwise communicate in a second language (e.g., a second language that the user can be known to speak, as indicated in a user profile associated with the user account) that can be different from the first language used with the voice information, as more fully described herein. If the unidentified user is able to suitably speak, read, or write the phrase or otherwise communicate in the second language, the authenticator component can determine that the unidentified user actually is the user, and can authenticate the user. If, instead, the unidentified user is not able to suitably speak, read, or write the phrase or otherwise communicate in the second language, the authenticator component can determine that the unidentified user is not the user, and can decline to authenticate the unidentified user and deny the unidentified user access to the user account and associated information and resources; or, in some embodiments, if it is still unclear whether the unidentified user is the user or is a fraudulent user, the authenticator component can perform another remedial or step-up authentication action to attempt to authenticate the unidentified user, such as described herein.

Additionally or alternatively, if and as desired, as another level of authentication, the authenticator component can employ one or more other types of authentication and verification techniques to attempt to verify and authenticate the unidentified user. As some examples, the authenticator component can utilize authentication credentials in the form of usernames, passwords, passcodes (e.g., sending a passcode via message to a phone number or email account associated with the user account), or personal identification numbers (PINs), personal questions relating to the user, other biometric information (e.g., fingerprint information, eye or iris biometric information, or facial biometric information), or other desired authentication and verification techniques to attempt to verify and authenticate the unidentified user as the user associated with the account.

These and other aspects and embodiments of the disclosed subject matter will now be described with respect to the drawings.

FIG. 1 illustrates a block diagram of an example, non-limiting system 100 that can desirably (e.g., efficiently, suitably, accurately, and/or optimally) perform authentication of voice information representative of a voice that is presented by an unidentified user to determine whether the voice information is a valid representation of the voice of a user associated with a user account or is a fraudulent representation of the voice of the user, in accordance with various aspects and embodiments described herein. The system 100 can comprise an authenticator component 102 that can perform authentication processes to authenticate users attempting to access user accounts and/or associated services or information. The authenticator component 102 can manage (e.g., control) access to user accounts 104, information 106 (e.g., information associated with users and user accounts 104), transactions 108 (e.g., transactions associated with users and user accounts 104), applications 110 (e.g., applications associated with users and user accounts 104), and/or services 112 (e.g., services associated with users and user accounts 104). Information 106 can comprise personal information of or associated with users, information relating to interactions between users and the system 100 and/or associated service entity, and/or other desired information. Personal information can comprise, for example, names of users, addresses of users, phone numbers of users, email addresses of users, usernames and authentication credentials of users (e.g., with regard to user accounts 104), financial information of or associated with users, financial account numbers (e.g., bank account numbers, credit account numbers, or loan account numbers) and/or other types of personal information. Transactions 108 can comprise, for example, purchases, subscriptions, or other types of transactions (e.g., purchases or subscriptions of or for services or products) made by or involving users, and information relating to such transactions. Applications 110 and services 112 can comprise virtually any type of application or service that a service entity or associated system 100 can provide, facilitate providing, or make available to users.

The system 100, including the authenticator component 102, can be utilized with and across various domains and domain services (e.g., services 112) associated with one or more service entities with which users can interact and have user accounts 104. For instance, users can have user accounts 104 with one or more of a first domain service, a second domain service, and/or other domain service up to N domain services, wherein N can be virtually any desired integer number, and wherein the system 100 can be associated with (e.g., the authenticator component 102 can be communicatively connected to), and can be utilized with and across, all such domain services and associated domains. In some embodiments, the authenticator component 102 can be or can comprise an identity and authentication gateway that can provide authentication and verification services to the domain services (e.g., services 112) to provide all of the domain services the ability to request authentication of users with regard to voice and other signals or data, as more fully described herein. The authenticator component 102 can receive audio signals and other session data relating to a session (e.g., an interaction) between a domain service and an unidentified user 114, and can communicate an authentication decision (e.g., user is authenticated, user is not authenticated, or another authentication-related decision) and/or reasons for the authentication decision back to the domain service. The authenticator component 102 and/or the services 112 also can comprise or be associated with (e.g., communicatively connected to) a conversational gateway that can provide one or more desired interfaces (e.g., conversational or audio interface, messaging or chat interface, or other desired interface) to receive (e.g., capture or obtain) audio signals or other session data from users (e.g., via communication devices, such as communication device 116) of users) and communicate audio signals or other session data to the users (e.g., to the communication devices associated with users).

In accordance with various embodiments, in connection with performing authentication processes and managing access to the user accounts 104, information 106, transactions 108, applications 110, and/or services 112, the authenticator component 102 can employ voice authentication and verification, wherein a user can speak (e.g., to a service representative of the service entity or to the system 100, and the authenticator component 102 can analyze the voice of the user, and based at least in part on the voice biometrics of the voice, the authenticator component 102 can verify whether the voice is actually the voice of the user, as opposed to a fraudulent attempt by another user (e.g., adversarial or malicious user) to represent as being the user.

In some embodiments, in connection with a user account 104 associated with a user, the authenticator component 102 can receive voice data representative of a voice purporting to be the user from an unidentified user 114, for example, via a communication device 116 (e.g., via a communication network with which the authenticator component 102 and communication device 116 can be associated. The unidentified user 114 potentially can be the user associated with the user account 104, or potentially can be another user (e.g., adversarial or malicious user) attempting to gain unauthorized access to the user account associated with the user. In some instances, the unidentified user 114 can be interacting with a service representative of a service entity associated with (e.g., that owns, manages, or utilizes) the system 100 and/or, in certain instances, the unidentified user 114 can be interacting with an automated system (e.g., automated voice interface system or interactive voice response (IVR) system) or virtual assistant (VA) component of or associated with the system 100, wherein the automated system or VA component can employ automatically generated voices to speak with users and entities that are engaging with the system 100 and/or associated service entity.

Examples of a communication device 116 can include, but are not limited to, a mobile terminal, a cellular and/or smart phone, a landline phone, a computer (e.g., a laptop embedded equipment (LEE), a laptop mounted equipment (LME), or other type of computer), a Personal Digital Assistant (PDA), a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, an oven, or other appliance having wireless communication functionality), a set-top box, an IP television (IPTV), a device associated or integrated with a vehicle (e.g., automobile, airplane, bus, train, ship, or other vehicle), a virtual assistant (VA) device, a drone, and/or any other type of communication devices (e.g., other types of Internet of Things (IoTs)).

In response to receiving the voice data representative of a voice purporting to be the user from the unidentified user 114, the authenticator component 102 can comprise and employ a voice verification component 118 that can employ voice biometric techniques to determine whether the voice data is a valid representation of the voice of the user associated with the user account 104 or is a fraudulent representation of the voice of the user, as more fully described herein. The voice verification component 118 can employ an analyzer component 120 that can analyze the voice data to determine a set of characteristics (e.g., set of voice characteristics) associated with the voice data. The characteristics can comprise, for example, voice or speech patterns of the voice of the user, tone of the voice, cadence or voice inflections of the voice, speed of speech of the user, a digital signal zero-crossings rate associated with the voice, the physical configuration of the user's mouth, throat, or other physiology of the user when speaking, or other characteristics of or associated with the voice data. In some embodiments, during the interaction, the authenticator component 102 can generate a voice print (e.g., current voice print) of the received voice data based at least in part on the characteristics associated with the voice data.

The authenticator component 102 also can comprise a voice print repository 122 that can securely store respective sets of previous voice prints (voice prints also referred to herein as voice fingerprints or voice print data), such as set of previous voice prints 124, set of previous voice prints 126, and set of previous voice prints 128, associated with (e.g., representative of) respective users associated with respective user accounts 104. With regard to each user, the authenticator component 102 can store a set of previous voice prints (e.g., 124) that can be representative of the voice of the user, as verified by the authenticator component 102. The authenticator component 102 can generate the set of previous voice prints (e.g., 124) associated with the user from voice information (e.g., audio signals comprising voice information) of the user obtained during previous interactions (e.g., previous authentication attempts or other interactions) between the user and the system 100 and/or associated service entity (e.g., service representative of or associated with the service entity), as more fully described herein. The authenticator component 102 can generate a previous voice print based at least in part on a phrase spoken by the user when attempting to authenticate with the authenticator component 102 or other words spoken by the user during an interaction, wherein the phrase can be something the authenticator component 102 or a service representative may request the user to speak as part of the authentication and verification process. In some embodiments, the authenticator component 102 can create or synthesize a voice print, which can be associated with a user, based at least in part on voice or speech patterns or other characteristics associated with the voice of the user, as determined by the authenticator component 102 from one or more previous voice prints or audio signals associated with the user, as more fully described herein, wherein such voice print can be utilized as a previous voice print and included in the set of previous voice prints (e.g., 124) associated with the user. Each of the previous voice prints (e.g., previously stored voice prints) of the set of previous voice prints (e.g., 124) can comprise a set of characteristics of the voice represented in the previous voice print.

In certain embodiments, with regard to respective user accounts 104 and associated users, the voice print repository 122 also can store respective designated voice prints (e.g., a golden voice print or voice fingerprint), such as, for example, designated voice print 130 (design. voice print), designated voice print 132, and designated voice print 134, wherein a designated voice print can be considered to be an exemplary voice print that can be representative the voice and associated voice characteristics of the user. In some embodiments, a designated voice print (e.g., 130, 132, or 134) can be a different or separate voice print from a set of previous voice prints (e.g., 124, 126, or 128) associated with a user account 104 and user. In other embodiments, a designated voice print (e.g., 130, 132, or 134) can be one of the previous voice prints in a set of previous voice prints (e.g., 124, 126, or 128) associated with the user account 104 and user.

The number of previous voice prints maintained in a set of previous voice prints (e.g., 124, 126, or 128) can be virtually any desired number, such as, for example, (up to) five, eight, ten, or other desired number of previous voice prints that can be greater than or lesser than ten. The authenticator component 102 can determine which previous voice prints to maintain in a set of previous voice prints (e.g., 124, 126, or 128) associated with a user account 104 and user, and which previous voice prints to remove from the set of previous voice prints, based at least in part on a variety of factors, including the number of previous voice prints in the set of previous voice prints, the defined threshold maximum number of previous voice prints that can be stored in the set of previous voice prints, an age of a previous voice print, the quality of a previous voice print, and/or other desired factors, in accordance with defined authentication criteria. For example, the authenticator component 102 can determine that, after a voice print of a current interaction is verified as being the voice of a user, that current voice print is to be stored as a previous voice print in the set of previous voice prints (e.g., 124, 126, or 128) associated with the user account 104 and user, and the oldest previous voice print in the set of previous voice prints (e.g., 124, 126, or 128) is to be removed (e.g., deleted or discarded) from the set of previous voice prints (e.g., if the set of previous voice prints already has a maximum number of voice prints and is not able to store the current voice print without removing one of the previous voice prints from the set of previous voice prints). As another example, the authenticator component 102 can determine that, after a voice print of a current interaction is verified as being the voice of a user, that current voice print is to be stored as a previous voice print in the set of previous voice prints (e.g., 124, 126, or 128) associated with the user account 104 and user, if the quality of the current voice print is determined by the authenticator component 102 to be higher than the quality of one of the previous voice prints (e.g., a lowest quality voice print) in the set of previous voice prints, and the previous voice print having the lowest quality is to be removed from the set of previous voice prints.

The voice verification component 118 can be or can comprise a voice analytics engine that, at authentication time during an interaction, can analyze (e.g., compare) the current (e.g., received) voice data associated with a voice presented by an unidentified user 114 to a designated voice print (e.g., 130) and/or previous voice prints (e.g., 124) associated with an user account 104 of a user using probabilistic matching to generate one or more voice resemblance scores (e.g., similarity scores or voice "closeness" scores) that can be evaluated to determine whether the voice is the actual live voice of the user associated with the user account 104 or is a fraudulent representation of the voice of the user, as more fully described herein. In accordance with various embodiments, the voice verification component 118 can utilize (e.g., apply) precise matching techniques and algorithms, and/or fuzzy matching techniques and algorithms, to determine how closely received voice data (e.g., characteristics associated with the received voice data) matches a voice print (e.g., characteristics associated with a designated or previous voice print) and/or determine a voice resemblance score associated with the received voice data and the voice print. The voice verification component 118 can comprise a fraud detector component 136 that can analyze (e.g., compare) the set of characteristics (e.g., attributes) of the voice data (and/or the current voice print associated with the set of characteristics) and the set of characteristics associated with the designated voice print (e.g., 130) and the set of previous voice prints (e.g., 124) associated with the user account 104 of the user. Based at least in part on the results of such analysis, the fraud detector component 136 can determine whether the voice data presented during the current interaction with the unidentified user 114 is a valid representation of the voice of the user (e.g., is the actual and live voice of the user) or is a fraudulent representation of the voice of the user, in accordance with the defined authentication criteria, as more fully described herein. The detection of fraudulent voice representations by the fraud detector component 136 can comprise, for example, voice emulation detection 138 and voice replay detection 140. Voice emulation can relate to instances where an entity is using an artificially created voice that emulates a voice of a user to attempt to authenticate to a user account 104 of the user. Voice replay can relate to instances where an entity is using a recording of the actual voice of the user and is replaying the recording of the actual voice of the user to attempt to authenticate to the user account 104 of the user.

Figure 2:
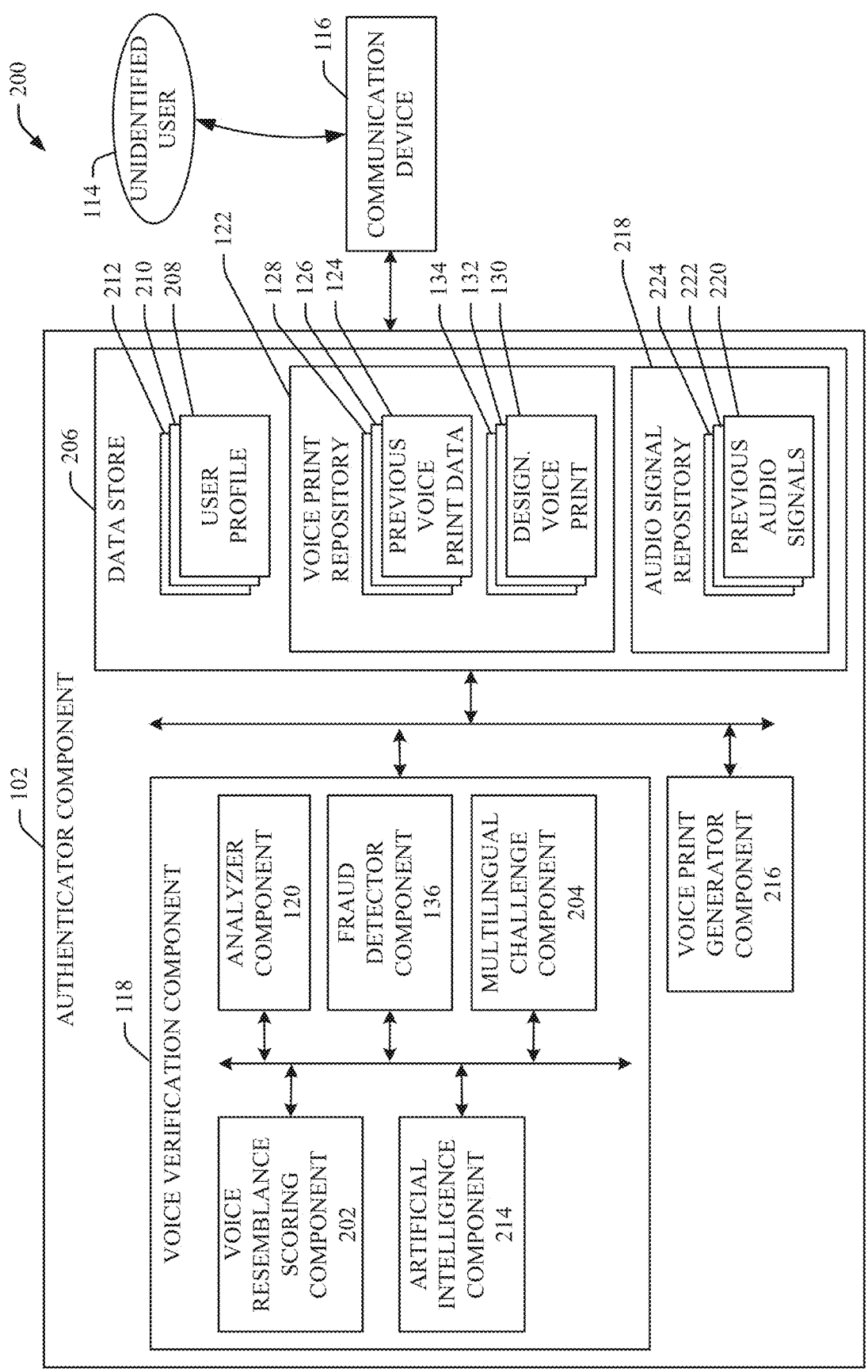
FIG. 2 depicts a block diagram of another example, non-limiting system that can desirably perform authentication of voice information representative of a voice that is presented by an unidentified user to determine whether the voice information is a valid representation of the voice of a user associated with a user account or is a fraudulent representation of the voice of the user, in accordance with various aspects and embodiments described herein.

Referring to FIG. 2 (along with FIG. 1), FIG. 2 depicts a block diagram of another example, non-limiting system 200 that can desirably (e.g., efficiently, suitably, accurately, and/or optimally) perform authentication of voice information representative of a voice that is presented by an unidentified user to determine whether the voice information is a valid representation of the voice of a user associated with a user account or is a fraudulent representation of the voice of the user, in accordance with various aspects and embodiments described herein. To facilitate the authentication and verification of users, the authenticator component 102 can employ a multi-level authentication and verification process that can be performed in real time or at least substantially in real time. For instance, the authenticator component 102, employing the voice verification component 118, can perform a first level of authentication and verification to determine whether the voice data received from the unidentified user 114 is sufficiently similar enough to the designated voice print 130 associated with the user account 104 and user to indicate that the voice data may be the actual live voice of the user, and if determined to be sufficiently similar can perform a second level of authentication and verification to determine whether the received voice data too closely matches (e.g., is too closely similar to) a previous voice print of the set of previous voice prints 124 associated with the user account 104 and user, which can indicate that the voice data can be fraudulent. In some embodiments, the voice verification component 118 can perform the first level of authentication and verification and the second level of authentication and verification in parallel (e.g., concurrently, simultaneously, or substantially simultaneously). In certain embodiments, in instances where the second level of authentication and verification provides an indication that the received voice data may be fraudulent, the voice verification component 118 can perform a third level (or other subsequent level of) authentication and verification, where the voice verification component 118 can employ a multilingual challenge to have the unidentified user 114 speak, read, or write in a second language that can be different from the first language used with the voice data to determine whether the unidentified user 114 actually is the user, as more fully described herein.

To facilitate authentication and verification, the voice verification component 118 can comprise a voice resemblance scoring component 202 that can determine (e.g., calculate) and generate voice resemblance scores (e.g., similarity scores) based at least in part on a comparison of a set of characteristics associated with received voice data and a designated voice print (e.g., designated voice print 130) and/or a comparison of the set of characteristics associated with the received voice data and a set of previous voice prints (e.g., set of previous voice prints 124). With regard to a voice resemblance score determined in relation to a designated voice print, a voice resemblance score determined by the voice resemblance scoring component 202 can indicate a level of similarity between the set of voice characteristics associated with the received voice data and the set of characteristics associated with the designated voice print (e.g., designated voice print 130), and the voice resemblance score can be, or can be based at least in part on (e.g., can be determined as a function of), a probability that the set of voice characteristics associated with the received voice data is a match to the set of characteristics associated with the designated voice print (e.g., designated voice print 130). With regard to a voice resemblance score determined in relation to a set of previous voice prints, a voice resemblance score determined by the voice resemblance scoring component 202 can indicate a level of similarity between the set of voice characteristics associated with the received voice data and the set of characteristics associated with a previous voice print of the set of previous voice prints (e.g., set of previous voice prints 124), and the voice resemblance score can be, or can be based at least in part on (e.g., can be determined as a function of), a probability that the set of voice characteristics associated with the received voice data is a match to the set of characteristics associated with the previous voice print of the set of previous voice prints (e.g., set of previous voice prints 124). Typically, the higher the level of similarity between a set of voice characteristics associated with received voice data and a set of characteristics associated with a previous voice print, the higher the voice resemblance score can be.

For instance, with regard to the voice data received from the unidentified user 114, the voice resemblance scoring component 202 can compare the set of characteristics (e.g., voice patterns, digital signal zero-crossings rate associated with the voice, and/or other characteristics) associated with the received voice data to the set of characteristics associated with the designated voice print 130 associated with the user account 104 of the user. Based at least in part on the results of such comparison, the voice resemblance scoring component 202 can determine a first voice resemblance score.

The fraud detector component 136 can compare the first voice resemblance score to a first threshold voice resemblance score (e.g., first threshold similarity score) to determine whether the first voice resemblance score satisfies (e.g., exceeds; is above) the first threshold voice resemblance score. The first threshold (e.g., threshold minimum) voice resemblance score can indicate whether the set of characteristics associated with the voice data are sufficiently close enough (e.g., are sufficiently same or similar) to the set of characteristics associated with the designated voice print 130 to indicate (e.g., at least provide a preliminary indication) that the voice associated with the voice data is the voice of the user associated with the user account 104. The authenticator component 102 can determine or set the first threshold voice resemblance score, in accordance with the defined authentication criteria. In accordance with various embodiments, the first threshold voice resemblance score can be or can correspond to a range of 70% to 90% probability that voice data is a match to a designated voice print (e.g., as or when indicated or specified by the defined authentication criteria). It is to be appreciated and understood though that, in other embodiments, the first threshold voice resemblance score can be or can correspond to a probability of a match between voice data and a designated voice print that can be lower than 70% or higher than 90% (e.g., as or when indicated or specified by the defined authentication criteria).

If, based at least in part on the comparison results, the fraud detector component 136 determines that the first voice resemblance score is lower than or equal to the first threshold voice resemblance score, the fraud detector component 136 can determine that the voice data is not a match to the designated voice print 130. In response to the determination that the voice data is not a match to the designated voice print 130, the authenticator component 102 can determine that the unidentified user 114 and/or associated communication device 116 are not to be authenticated with regard to the user account 104, and the unidentified user 114 and/or associated communication device 116 can be denied access to the user account 104 and/or associated information 106, transactions 108, applications 110, and/or services 112. In some embodiments, even if the voice verification component 118 determines that received voice data is not a match to the designated voice print 130 (or previous voice print) associated with a user account, the voice verification component 118 can store the voice print associated with (e.g., generated from) the voice data in a file associated with the user in the voice print repository 122, wherein the voice print can be tagged or flagged with a failed authentication indicator to facilitate detecting or identifying potential fraudulent or malicious attempts to access the user account 104 of the user. For instance, if the authenticator component 102 detects multiple failed authentication attempts associated with a user account 104 of a user, the authenticator component 102 can perform responsive or remedial actions to mitigate fraudulent or malicious access to the user account 104 of the user, wherein such responsive or remedial actions can comprise, for example, sending a notification (e.g., an alert) message to a service representative or the user to indicate that one or more potentially fraudulent or malicious attempts to access the user account 104 of the user have been detected, lock (e.g., temporarily lock) the user account 104, request the user to create or submit a new authentication credential, securely send the user a new authentication credential, close the user account of the user and open a new account for the user, or perform another desired responsive or remedial action.

If, instead, based at least in part on the comparison results, the fraud detector component 136 determines that the first voice resemblance score is above the first threshold voice resemblance score, the fraud detector component 136 can determine that the voice data can be a sufficient (e.g., suitable) match to the designated voice print 130, which can provide at least a preliminary indication that the voice represented by the received voice data potentially can be the voice of the user associated with the user account 104. In response to the determination that the voice data is a match to the designated voice print 130, the voice verification component 118 can perform the second level of authentication and verification. The voice verification component 118 can access the set of previous voice prints 124 associated with the user account 104 of the user from the voice print repository 122. The voice resemblance scoring component 202 can compare the set of characteristics associated with the received voice data to the respective sets of characteristics associated with respective previous voice prints of the set of previous voice prints 124. Based at least in part on the results of such comparison, the voice resemblance scoring component 202 can determine a second voice resemblance score, which can correspond to a level of similarity between the set of characteristics associated with the received voice data and set of characteristics associated with a previous voice print of the set of previous voice prints 124.

The fraud detector component 136 can compare the second voice resemblance score to a second threshold voice resemblance score (e.g., second threshold similarity score) to determine whether the second voice resemblance score satisfies (e.g., exceeds; is above) the second threshold voice resemblance score. The second threshold (e.g., threshold minimum) voice resemblance score can indicate whether the set of characteristics (e.g., one or more characteristics) associated with the received voice data is too similar (e.g., to close to being the same as) the set of characteristics (e.g., one or more characteristics) associated with a previous voice print of the set of previous voice prints 124 to indicate that the voice associated with the received voice data is fraudulent (e.g., is a fraudulent artificially created voice that emulated the voice of the user or is a replay of a recording of the voice of the user). The authenticator component 102 can determine or set the second threshold voice resemblance score, in accordance with the defined authentication criteria. In accordance with various embodiments, the second threshold voice resemblance score can be or can correspond to a range of approximately 90% to 100% probability that the received voice data is a match to a previous voice print of the set of voice prints 124 (e.g., as or when indicated or specified by the defined authentication criteria). It is to be appreciated and understood though that, in other embodiments, the second threshold voice resemblance score can be or can correspond to a probability of a match between voice data and a designated voice print that can be lower than 90% (e.g., as or when indicated or specified by the defined authentication criteria).

If, based at least in part on the comparison results, the fraud detector component 136 determines that the second voice resemblance score is lower than or equal to (e.g., does not satisfy) the second threshold voice resemblance score, the fraud detector component 136 can determine that the received voice data is not too close of a match to the set of previous voice prints 124, and, accordingly, can determine that the voice associated with the received voice data is valid or verified as being the voice of the user. In response to determining that the voice has been verified as being the voice of the user (e.g., actual and live voice of the user), the authenticator component 102 can authenticate the user (e.g., can recognize the previously unidentified user 114 as the user) and/or associated communication device 116, and can grant the user and/or communication device 116 access to the user account 104 and/or associated information 106, transactions 108, applications 110, and/or services 112.

In some embodiments, if the voice verification component 118 determines that the voice verification of the received voice data during an interaction sufficiently (e.g., to a desirably high degree of certainty or high level of probability) indicates that the voice data represents the actual live voice of the user associated with the user account 104, and is not a fraudulent representation of the voice of the user, the voice verification component 118 can tag the voice print determined from that voice data as being verified as the voice of the user associated with the user account 104. The voice verification component 118 can store the voice print tagged as verified as a previous voice print in the set of previous voice prints (e.g., 124) associated with the user account 104, and/or, additionally or alternatively, can utilize the voice print tagged as verified as a designated voice print (e.g., as an additional designated voice print) associated with the user account 104.

In response to storing the voice print tagged as verified as a previous voice print in the set of previous voice prints (e.g., 124), the voice verification component 118 can determine whether to remove one of the previous voice prints (e.g., the oldest previous voice print or lowest quality voice print) from the set of previous voice prints (e.g., 124), in accordance with (e.g., as indicated or specified by) defined authentication criteria. Also, if the voice verification component 118 stores the voice print tagged as verified as a designated voice print, the voice verification component 118 can determine whether a currently stored designated voice print (e.g., 130) associated with the user account 104 is to be removed from the data store 206, whether the voice print tagged as verified is to replace a primary designated voice print associated with the user account 104 as a new primary designated voice print, and/or whether to add the voice print tagged as verified to a group of designated voice prints associated with the user account 104 without removing a currently stored designated voice print, in accordance with (e.g., as indicated or specified by) defined authentication criteria.

With further regard to the comparison results, if, instead, based at least in part on the comparison results, the fraud detector component 136 determines that the second voice resemblance score is above the second threshold voice resemblance score, the fraud detector component 136 can determine that the received voice data is too close of a match to a previous voice print of the set of previous voice prints 124, which can indicate, or at least can provide a preliminary indication, that the voice represented by the received voice data is or at least potentially can be fraudulent (e.g., an artificially generated voice that emulates the voice of the user, or a replay of a recording of the voice of the user).

In some embodiments, if the fraud detector component 136 determines that the received voice data is too close of a match to a previous voice print of the set of previous voice prints 124, the fraud detector component 136 can determine that the received voice data is fraudulent (without performing a third level of authentication and verification), when in accordance with the defined authentication criteria. For example, if the second voice resemblance score corresponds to a 100% or almost 100% (e.g., 99%) probability, which can indicate that there can be a high probability that the received voice data is fraudulent, the fraud detector component 136 can determine that it is not desirable (e.g., not necessary or useful) to utilize further resources (e.g., computing resources, time resources, or other resources) to perform the third level of authentication and verification to attempt to verify the received voice data and associated unidentified user 114. Accordingly, the authenticator component 102 can determine that the unidentified user 114 and/or associated communication device 116 are not to be authenticated with regard to the user account 104, and the unidentified user 114 and/or associated communication device 116 can be denied access to the user account 104 and/or associated information 106, transactions 108, applications 110, and/or services 112.

In other embodiments, if the fraud detector component 136 determines that the received voice data is too close of a match to a previous voice print of the set of previous voice prints 124, the fraud detector component 136 can perform a third level of authentication and verification (such as a multilingual challenge, and/or another desired type of authentication challenge) to attempt to verify the received voice data and associated unidentified user 114. The authenticator component 102 can employ the multilingual challenge and verification, for example, in instances where the received voice data associated with the unidentified user 114 is determined to be a borderline case where there can be some indication that the voice may be fraudulent (e.g., emulated voice of the user, or replay of a recording of the voice of the user) or determined to a likely case that the voice is fraudulent. To facilitate performing the multilingual challenge, the voice verification component 118 can comprise a multilingual challenge component 204 that can be employed to present a multilingual challenge to the unidentified user 114 (e.g., via the communication device 116). The fraud detector component 136, employing the multilingual challenge component 204, can generate or present a multilingual challenge, and/or can initiate the multilingual challenge, that can involve requesting that the unidentified user 114 speak or respond in a second language (e.g., Spanish, Italian, Chinese, Japanese, or other desired language) that can be different from the first language (e.g., English or other language) used by the voice in the received voice data.

For instance, the fraud detector component 136, employing the multilingual challenge component 204, can initiate, generate, or present a request that the unidentified user 114 speak a phrase or answer a question using the second language. In certain embodiments, the multilingual challenge component 204 can determine and generate the phrase or question in the second language randomly or pseudo-randomly (e.g., using a random or pseudo-random number generator to generate random or pseudo-random numbers, wherein respective random or pseudo-random numbers can map to respective (e.g., different) phrases). In other embodiments, the multilingual challenge component 204 can determine and generate the phrase or question based at least in part on which phrase or question is next on a list of phrases or questions.

In some embodiments, additionally or alternatively, the fraud detector component 136, employing the multilingual challenge component 204, can initiate the multilingual challenge to have a service representative of the service entity associated with the system (e.g., system 200) converse with the unidentified user 114 using the second language and requesting that the unidentified user 114 respond back speaking in the second language, wherein the conversation can comprise the phrase or question, or can be a free form conversation using the second language.

In still other embodiments, the fraud detector component 136, employing the multilingual challenge component 204, can communicate a multilingual challenge (e.g., a question) in the second language to the communication device 116 or messaging account (e.g., instant message account, email account, or other type of messaging account) associated with the phone number of the communication device 116 or user account 104, and can request that the unidentified user 114 read the message, comprising the multilingual challenge in the second language, and respond back by communicating a response message, comprising an appropriate response, written in the second language, to the multilingual challenge with such response message being sent to the authenticator component 102 via the system 200.

To determine which second language to use for the multilingual challenge, the fraud detector component 136, the multilingual challenge component 204, or the service representative can access a user profile associated with the user account 104 and user from a data store 206. The data store 206 can comprise user profiles, such as user profile 208, user profile 210, and user profile 212, that can be associated with user accounts and users. The respective user profiles (e.g., 208, 210, and 212) can comprise respective information associated with respective user accounts and users, including respective user preferences of the respective users, respective languages spoken by respective users, respective locales associated with respective users, respective previous authentication attempts or other activity associated with respective user accounts 104, respective user journey histories associated with respective user accounts 104, respective designated voice prints (e.g., 130, 132, 134) associated with respective users, respective sets of previous voice prints (e.g., 124, 126, 128) associated with respective users, and/or other desired information relating to users. The fraud detector component 136, the multilingual challenge component 204, or the service representative can access information in a user profile (e.g., user profile 208) associated with the user account 104 and user, can determine what languages the user is able to speak based at least in part on the information in the user profile, and can determine or select the second language from the languages the user is able to speak. If, from the user profile (e.g., user profile 208) it is determined that the user does not speak or does not fluently speak a second language, the fraud detector component 136 or the multilingual challenge component 204 can determine a phrase, which can be a relatively less complex phrase, in a second language, can present (e.g., communicate) the phrase in the second language to the unidentified user 114, and can request that the unidentified user 114 repeat back the phrase using the second language.

As part of the multilingual challenge, the fraud detector component 136, analyzer component 120, or multilingual challenge component 204 can analyze (e.g., evaluate) voice data representing the voice of the unidentified user 114 speaking the phrase, the response to the question, or conversing using the second language. In some embodiments, based at least in part on the results of analyzing voice data associated with the unidentified user 114 speaking using the second language, the fraud detector component 136 can determine whether the unidentified user 114 satisfied (e.g., passed) the multilingual challenge. For instance, if the analysis results show or indicate that the unidentified user 114 was able to speak the phrase, respond to the question, or converse using the second language to a sufficiently high enough degree of speaking proficiency, the fraud detector component 136 can determine that the voice of the unidentified user 114 is verified as being the voice of the user.

In certain embodiments, as part of the multilingual challenge analysis, the fraud detector component 136, analyzer component 120, voice resemblance scoring component 202, or multilingual challenge component 204 can analyze the voice data associated with the unidentified user 114 speaking using the second language with a previous voice print, which can be in the second language, associated with the user account 104 and user to determine whether the voice data (e.g., characteristics associated with the voice data) associated with the unidentified user 114 speaking using the second language sufficiently matches the previous voice print (e.g., set of characteristics associated with the previous voice print) in the second language. The previous voice print in the second language can be part of the previous voice prints (e.g., set of previous voice prints 124) associated with the user account 104 and stored in the voice print repository 122. As an example, the voice resemblance scoring component 202 can determine a voice resemblance score based at least in part on the results of comparing the set of characteristics associated with the voice data associated with the second language and the set of characteristics associated with the previous voice print in the second language. The fraud detector component 136 can determine whether the voice resemblance score satisfies an applicable threshold voice resemblance score, in accordance with the defined authentication criteria. In accordance with various embodiments, the applicable threshold voice resemblance score for the multilingual challenge can be same as or different from the first or second threshold voice resemblance scores.

If the fraud detector component 136 determines that the voice data associated with the second language satisfies (e.g., passes; or is above the applicable threshold voice resemblance score), the fraud detector component 136 can determine that the voice associated with the received voice data is valid or verified as being the voice of the user. In response to determining that the voice has been verified as being the voice of the user (e.g., actual and live voice of the user), the authenticator component 102 can authenticate the user (e.g., can recognize the previously unidentified user 114 as the user) and/or associated communication device 116, and can grant the user and/or communication device 116 access to the user account 104 and/or associated information 106, transactions 108, applications 110, and/or services 112.

If, instead, the fraud detector component 136 determines that the voice data associated with the second language does not satisfy (e.g., does not pass; or is at or below the applicable threshold voice resemblance score), the fraud detector component 136 can determine that the received voice data (e.g., originally received voice data and the voice data in the second language) is fraudulent. Accordingly, the authenticator component 102 can determine that the unidentified user 114 and/or associated communication device 116 are not to be authenticated with regard to the user account 104, and the unidentified user 114 and/or associated communication device 116 can be denied access to the user account 104 and/or associated information 106, transactions 108, applications 110, and/or services 112.

It is to be appreciated and understood that, while certain authentication and verification techniques associated with a multi-level process, are being described herein, the disclosed subject matter is not so limited, as, additionally or alternatively, the authenticator component 102 can utilize other types of authentication and verification techniques to attempt to verify and authenticate users. For example, additionally or alternatively (e.g., as part of the third level of authentication and verification), the authenticator component 102 can utilize authentication credentials in the form of usernames, passwords, passcodes, or PINs, personal questions relating to users, other biometric information (e.g., fingerprint information, eye or iris biometric information, or facial biometric information), or other desired authentication and verification techniques to attempt to verify and authenticate users.

For instance, to attempt to authenticate the unidentified user 114, the authenticator component 102 can communicate a passcode (e.g., a unique numeric or alphanumeric text string) as part of a message (e.g., text message or email message) to a phone number or email account associated with the user account 104, and can request that the unidentified user 114 communicate back the passcode to verify or assist in verifying that the unidentified user 114 is actually the user associated with the user account 104. If the unidentified user 114, using the communication device 116, communicates the correct passcode to the authenticator component 102, the authenticator component 102 can determine that the unidentified user 114 is actually the user associated with the user account 104, or at least can determine that the receiving of the correct passcode from the unidentified user 114 can provide an indication that the unidentified user 114 is actually the user. If, instead, the unidentified user 114 is unable to successfully communicate the correct passcode to the authenticator component 102, the authenticator component 102 can determine that the unidentified user 114 is not the user associated with the user account 104, or at least can determine that the failure of the unidentified user 114 to provide the correct passcode can provide an indication that the unidentified user 114 is not the user.

As another example, to attempt to authenticate the unidentified user 114, the authenticator component 102 can request that the unidentified user 114 provide other biometric information (e.g., fingerprint information, eye or iris biometric information, or facial biometric information) besides the voice biometric information. If the unidentified user 114 provides such other biometric information (e.g., via communication device 116), the authenticator component 102 can analyze such other biometric information, including comparing such other biometric information to corresponding biometric information (e.g., corresponding fingerprint information, eye or iris biometric information, or facial biometric information) associated with the user account 104 and stored in the data store 206 (e.g., in or associated with a user profile of the user). If, based at least in part on the analysis of the other biometric information, the authenticator component 102 determines that the other biometric information received from the unidentified user 114 satisfies a defined matching criterion (e.g., sufficiently matches) with regard to the corresponding biometric information, the authenticator component 102 can determine that the unidentified user 114 is actually the user associated with the user account 104, or at least can determine that the receiving of the correct passcode from the unidentified user 114 can provide an indication that the unidentified user 114 is actually the user. If, instead, the authenticator component 102 does not receive such other biometric information from the unidentified user 114, or if the authenticator component 102 receives such other biometric information from the unidentified user 114, but, based at least in part on the analysis, the other biometric information is determined to not satisfy the defined matching criterion (e.g., is not a match) with regard to the corresponding biometric information, the authenticator component 102 can determine that the unidentified user 114 is not the user associated with the user account 104, or at least can determine that the failure of the unidentified user 114 to provide other suitable (e.g., matching) biometric information can provide an indication that the unidentified user 114 is not the user.

With further regard to the multi-level process, in certain embodiments, as part of the second level (or another level) of authentication and verification, in addition to or as an alternative to comparing the voice data to the set of previous voice prints 124 associated with the user account 104, the voice verification component 118 can compare the voice data to one or more voice prints associated with the user account 104 that were tagged or flagged with a failed authentication indicator, and stored in the data store 206 (e.g., in the voice print repository 122 stored in the data store 206), during one or more previous interactions between one or more unidentified users (e.g., 114) and the system or associated service entity where the authenticator component 102 determined that the authentication attempt to authenticate with regard to the user account 104 failed, such as more fully described herein. For instance, the fraud detector component 136 can compare the characteristics of the voice data to the characteristics of the one or more tagged or flagged voice prints (e.g., tagged or flagged with a failed authentication indicator) to determine whether the characteristics of the voice data sufficiently match the characteristics of the one or more tagged or flagged voice prints, wherein a match can indicate that the voice data potentially can be fraudulent. For example, based at least in part on the comparing of the characteristics of the voice data to the characteristics of the one or more tagged or flagged voice prints, the fraud detector component 136 can determine a voice resemblance score (e.g., a third voice resemblance score) that can indicate how similar the voice data is to a tagged or flagged voice print(s). The fraud detector component 136 can compare the voice resemblance score to a threshold voice resemblance score (e.g., a third threshold voice resemblance score). If the voice resemblance score satisfies (e.g., meets or exceeds; or is equal to or greater than) the threshold voice resemblance score, the fraud detector component 136 can determine that the voice data sufficiently matches the tagged or flagged voice print(s), and accordingly, can determine that the voice data is fraudulent or at least can determine that the voice data potentially can be fraudulent. If, instead, the voice resemblance score does not satisfy (e.g., does not meet or exceed; or is less than) the threshold voice resemblance score, the fraud detector component 136 can determine that the voice data does not match the tagged or flagged voice print(s), and accordingly, can determine that the voice data is not fraudulent or at least can determine that there can be an indication that the voice data is not fraudulent.

In some embodiments, a previous voice print (e.g., 124) or corresponding previous audio signal (e.g., audio signal used to generate the previous voice print) associated with a user account 104 of a user can be from a current interaction (e.g., a previous or earlier part of the current interaction) between an unidentified user 114 and the authenticator component 102 or associated service entity. For instance, during a first part of the current interaction, the authenticator component 102 can receive a first audio signal comprising first voice data (e.g., representative of a voice) from the unidentified user 114. For example, the authenticator component 102, or a service representative or VA associated with a service entity, can present (e.g., communicate) a request for the unidentified user 114 to speak a phrase or can otherwise solicit a verbal response from the unidentified user 114, and the authenticator component 102 can receive the first voice data, which can comprise the speaking of the phrase or the verbal response. The authenticator component 102 (e.g., employing the voice verification component 118, an AI component 214, and/or a voice print generator component 216) can determine first characteristics of the first voice data and/or generate a first voice print, which can have the first characteristics, based at least in part on the results of analyzing the first audio signal (e.g., in real time or substantially in real time).

If the voice verification component 118 determines that the first voice print potentially can be fraudulent, for example, due to the second voice resemblance score between the first voice print and a previous voice print (e.g., 124) associated with the user account 104 being determined to satisfy the second threshold voice resemblance score, or at least being determined to come relatively close to satisfying (e.g., close to meeting, exceeding, or otherwise breaching) the second threshold voice resemblance score, during the second part (e.g., next part) of the current interaction, the authenticator component 102, or the service representative or VA associated with the service entity (e.g., as instructed or recommended by the authenticator component 102), can request the unidentified user 114 to repeat the phrase or verbal response (e.g., "I did not quite hear what you said. Can you please repeat the phrase (or the verbal response) again?"), even though the authenticator component 102, or the service representative or VA, understood the phrase or other verbal response presented by the unidentified user 114 the first time. The authenticator component 102 can receive a second audio signal comprising second voice data (e.g., representative of the voice) from the unidentified user 114, wherein the second voice data can comprise the repeating of the phrase or verbal response. The voice verification component 118 can determine the characteristics of the second voice data based at least in part on the results of analyzing the second voice data. The voice verification component 118 also can compare the characteristics of the second voice data to the characteristics of the first voice print (or first voice data of the first audio signal), which can now be a previous voice print (or previous voice data) in relation to the second voice data. Based at least in part on such comparison, the voice verification component 118 can determine a second voice resemblance score associated with the second voice data and the first voice data (and/or can determine the first voice resemblance score with regard to a designated voice print as well). If, during the first part of the interaction when the unidentified user 114 first presented the phrase or other verbal response, and during the second part of the interaction when the unidentified user 114 repeated the phrase or other verbal response, the unidentified user 114 was replaying a recording of the voice of the user associated with the user account 104 or using an artificially generated voice that emulates the voice of the user, the second voice resemblance score relating to the first voice data and second voice data typically can be relatively high and satisfy the second threshold voice resemblance score, and accordingly, the voice verification component 118 can determine that the first voice data and second voice data can be fraudulent (e.g., as being a replay of a recording of the voice of the user or an artificially generated voice emulating the voice of the user). Accordingly, the authenticator component 102 can decline to authenticate the unidentified user 114 with regard to the user account 104 of the user and can deny the unidentified user 114 access to the user account 104 and associated information and services.

It is noted that, even if somehow an adversarial user was able to use a replay of a recording of the voice of the user associated with the user account 104 or an artificially generated voice (e.g., deep fake voice) that emulates the voice of the user on one occasion to authenticate as being the user with the system, the voice verification component 118 can have the capability to detect if the adversarial user attempts to use the replay of the recording of the voice of the user or the artificially generated voice that emulates the voice of the user in a future attempt to authenticate with the authenticator component 102. For instance, the voice verification component 118 can have a previous voice print (e.g., 124) of the recording of the voice of the user or the artificially generated voice that emulates the voice of the user from that previous interaction. During a current interaction with the authenticator component 102, when the adversarial user attempts to use the recording or artificially generated voice again, the voice verification component 118 can compare the characteristics of the recording or artificially generated voice used during the current interaction to the characteristics of the previous voice print (e.g., 124) generated from the previous use of the recording or artificially generated voice (e.g., during an earlier part of the current interaction or during a previous interaction), and can determine a second voice resemblance score based at least in part on such comparison. The voice verification component 118 also can determine that the second voice resemblance score satisfies the second threshold voice resemblance score, which can indicate that the current voice data associated with the re-use of the recording or artificially generated voice can be too close of a match to the previous voice print and therefore can be fraudulent. Based at least in part on such determination and/or the results of performing another layer of authentication and verification (e.g., multilingual challenge or other desired authentication procedure), the authenticator component 102 can determine that the adversarial user is not the user associated with the user account 104, and can decline to authenticate the adversarial user and deny the adversarial user access to the user account 104 of the user and associated information and services. As a result, the disclosed subject matter, employing the authenticator component 102, still can desirably inhibit improper (e.g., unauthorized) access to a user account 104 of a user, and associated information and services, and increase the amount of effort and resources the adversarial user has to use to try to improperly gain access to the user account 104, and the associated information and services, even if the adversarial user somehow was able improperly authenticate with regard to the user account 104 of the user one time using the recording or artificially generated voice.

In accordance with various embodiments, the voice verification component 118 can comprise or be associated with an artificial intelligence (AI) component 214 that can be associated with (e.g., communicatively connected to) the other components (e.g., analyzer component 120, fraud detector component 136, voice resemblance scoring component 202, multilingual challenge component 204, data store 206, or other component) of the voice verification component 118 or system 200 to enable the AI component 214 to communicate with such other components and facilitate performance of operations by the voice verification component 118 or system 200. The AI component 214 can perform an AI analysis (e.g., AI, machine learning, and/or neural network analysis) on voice data, designated voice prints, previous voice prints, or previously stored voice information (e.g., audio signals) that can correspond to previous voice prints, information stored in user profiles of users, contextual information relating to an interaction involving a user or unidentified entity, and/or other information to facilitate making various determinations or inferences relating to verifying or authenticating voices of entities, as more fully described herein. As some examples, the AI component 214 can employ AI, machine learning, and/or neural network techniques, analysis, and algorithms to facilitate determining or inferring voice characteristics or biometrics associated with voice data representative of voices in audio signals, performing voice recognition of voices (e.g., determining or inferring voices) represented in voice data, determining or inferring voice prints (e.g., current voice print, designated voice print, or previous voice print) and associated characteristics, determining or inferring voice resemblance scores relating to a comparison of voice prints (e.g., comparison of current voice print to designated voice print or previous voice print), determining or inferring whether a voice represented in voice data (e.g., received voice data) is an actual live voice of a user or is a fraudulent voice (e.g., artificially created voice that emulates the voice of the user, or a replay of a recording of the voice of the user), and/or making other desired determinations or inferences relating to verifying or authenticating voices of entities, as more fully described herein.

The voice verification component 118, employing the AI component 214, fraud detector component 136, or other component of the voice verification component 118, can detect and take into account various tactics that an adversarial user may use to try to improperly authenticate with the system to improperly access a user account 104 associated with a user and/or associated information or services. For example, an adversarial user may speed up, slow down, or otherwise modify a recording of the voice of the user (e.g., while maintaining the original pitch or close to the original pitch of the voice of the user) to try to change some of the characteristics of the voice in the recording in order to try to keep the authenticator component 102 from detecting that the adversarial user is using the recording of the user's voice to try to authenticate with the system and improperly access the user account 104 of the user. When voice data (e.g., the user's voice in one interaction; or, in another interaction, a sped up, slowed down, or otherwise modified replay of the recording of a voice of the user) is received from an unidentified user 114 (e.g., the user in one interaction; or an adversarial user in another interaction), the voice verification component 118 (e.g., employing the AI component 214, fraud detector component 136, or other component) can analyze the voice data (e.g., raw voice data), and/or can process (e.g., can de-trend or otherwise process) the voice data to generate processed or de-trended voice data. The voice verification component 118 (e.g., employing the AI component 214, fraud detector component 136, or other component) can analyze the raw voice data and/or the processed or de-trended voice data to determine or identify various characteristics associated with the voice data (e.g., the voice presented in the voice data), wherein the various characteristics can be numerous (e.g., ten, twenty, fifty, one hundred, or other desired number greater than or less than one hundred) and can relate to voice or other biometric information (e.g., biometric markers) that can make a user's voice and associated voice print unique to that user. The characteristics can be or can relate to, for example, voice or speech patterns of the voice of the user, tone of the voice, cadence or voice inflections of the voice, speed of speech of the user, a digital signal zero-crossings rate associated with the voice, the physical configuration of the user's mouth, throat, or other physiology of the user when speaking, or other characteristics of or associated with the voice (e.g., voice data) of the user. When the voice print generator component 216 generates a voice print from the voice data, the voice print can be generated based at least in part on the characteristics determined from the analysis of the raw voice data and/or processed or de-trended voice data.

In a case where, for example, the adversarial user has sped up, slowed down, or otherwise modified the recording of the voice of the user to try change characteristics associated with the user's voice in the recording to try to defeat the authentication process of the system, the voice verification component 118 (e.g., employing the AI component 214, fraud detector component 136, or other component) can still identify the voice data of the sped up, slowed down, or otherwise modified replay of the recording of the user's voice as being fraudulent (e.g., a fraudulent replay of the voice of the user) based at least in part on the results of the analysis of the characteristics of the voice data (e.g., raw voice data and/or processed or de-trended voice data) and characteristics of a previous voice print (e.g., 124) associated with the user account 104 of the user, as, for instance, the voice verification component 118 can determine that many other characteristics associated with the voice data can still be same as or substantially similar to the characteristics associated with the previous voice print (e.g., 124), even if the adversarial user has manipulated the recording of the voice of the user. The authenticator component 102 can thereby still detect a fraudulent replay of a recording of the voice of the user, even if the adversarial user sped up, slowed down, or otherwise modified the recording of the voice of the user. In some embodiments, the previous voice print (e.g., 124) can be one that was generated by the voice print generator component 216 based on the voice of the user when the user spoke during a previous interaction with the system or associated service entity, wherein the recording of the voice of the user, which the adversarial user is using, can be from that previous interaction. In other embodiments, the previous voice print (e.g., 124) can be from a different interaction between the user and the system or associated service entity, or can be a synthesized voice print that can be generated by the voice print generator component 216, as more fully described herein.

In accordance with various embodiments, the AI component 214 can perform an AI analysis on voice data, designated voice prints, previous voice prints, or previously stored voice information (e.g., audio signals) that can correspond to previous voice prints, information stored in user profiles of users, contextual information relating to an interaction involving a user or unidentified entity, and/or other information utilizing one or more desired AI techniques or algorithms, which can comprise, for example, frequency estimation, a hidden Markov model, a Gaussian mixture model, a pattern matching algorithm, a neural network, a matrix representation, a vector quantization, a decision tree, a cosine similarity technique, or another desired AI technique or algorithm.

The AI component 214 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 214 can examine the entirety or a subset of the data (e.g., data stored in the data store 206, voice data received from an entity, voice prints, information stored in user profiles, or other desired data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

In some embodiments, a classifier can map an input attribute vector, $z=(z1, z2, z3, z4, zn)$, to a confidence that the input belongs to a class, as by $f(z)=\text{confidence(class)}$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

With further regard to the voice print generator component 216, the voice print generator component 216 can determine and generate voice prints (e.g., current voice prints, designated voice prints, previous voice prints) based at least in part on the results of analyzing audio signals comprising voice data representative of voices of users or entities. For instance, the voice print generator component 216 can analyze (or can employ the analyzer component 120 to analyze) an audio signal comprising voice data representative of a voice of a user or entity. As part of the analysis the voice print generator component 216 (or the analyzer component 120) can determine a set of characteristics (e.g., one or more voice characteristics) relating to the voice presented in the audio signal, wherein the characteristics can comprise the types of characteristics described herein. Based at least in part on the results of the analysis of the audio signal, including the set of characteristics, the voice print generator component 216 can determine and generate a voice print that can be representative of the voice of the user or entity. Different voices typically can have different characteristics (e.g., different parameter values for different types of characteristics), and respective voice prints associated with respective users or entities can reflect or take into account the respective (e.g., different) characteristics associated with respective voices of respective users or entities.

In some embodiments, the voice print generator component 216 and AI component 214 can work in conjunction with each other to create or synthesize a voice print, which can be associated with a user associated with a user account 104, based at least in part on voice or speech patterns or other characteristics associated with the voice of the user, as determined by the voice print generator component 216 and/or AI component 214 from one or more previous voice prints (e.g., 124) or audio signals associated with the user. For instance, the AI component 214 can utilize (e.g., apply or execute) one or more desired AI, machine learning, or neural network techniques or algorithms to identify characteristics (e.g., voice or speech patterns, tone, voice inflections, or other characteristics) in previous voice prints associated with a user (e.g., previous voice prints stored in the voice print repository 122). The voice print generator component 216, in conjunction with the AI component 214, can create (e.g., generate) or synthesize a voice print based at least in part on the characteristics identified in the previous voice prints. In certain embodiments, the voice verification component 118 can utilize the created or synthesized voice print as a previous voice print and can include such voice print in the set of previous voice prints (e.g., 124) associated with the user account 104 of the user. Additionally or alternatively, the voice verification component 118 can utilize the created or synthesized voice print as a designated (e.g., golden) voice print (e.g., 130) that can be stored in the voice print repository 122 and can be associated with the user account 104 of the user.

The authenticator component 102 can store audio signals associated with a current interaction or previous interactions involving users or entities in the data store 206. For instance, the data store 206 can comprise an audio signal repository 218 in which sets of previous audio signals, such as set of previous audio signals 220, set of previous audio signals 222, and set of previous audio signals 224, associated with respective users can be stored. The voice verification component 118, voice print generator component 216, or other component of the authenticator component 102 can access the audio signal repository 218 to retrieve desired audio signals (e.g., a set of previous audio signals) from the audio signal repository 218 for analysis, to determine voice characteristics of a voice present in an audio signal, to determine a voice print of a voice present in an audio signal, to compare to another audio signal (e.g., a current audio signal associated with a current interaction involving a user or entity).

In some embodiments, the voice verification component 118, analyzer component 120, or voice print generator component 216 can analyze audio signals (e.g., current and/or previous audio signals) in real time or substantially close to real time to determine voice characteristics of a voice present in an audio signal, determine a voice print of a voice present in an audio signal, compare respective voices or voice characteristics associated with respective audio signals, or determine voice resemblance scores with regard to respective voices or voice characteristics associated with respective audio signals.

Figure 3:
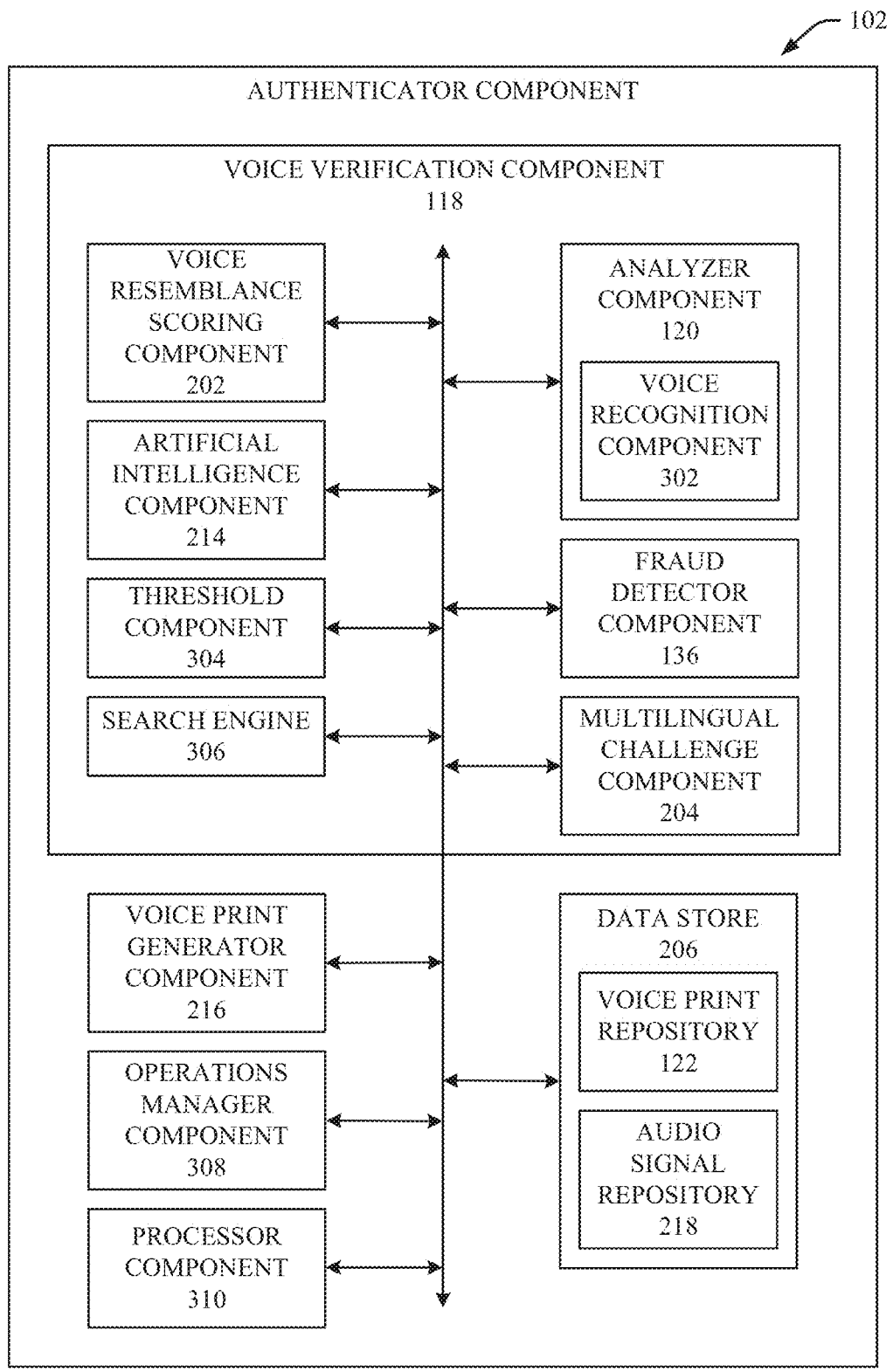
FIG. 3 illustrates a block diagram of an example, non-limiting authenticator component, in accordance with various aspects and embodiments of the disclosed subject matter.

FIG. 3 illustrates a block diagram of an example, non-limiting authenticator component 102, in accordance with various aspects and embodiments of the disclosed subject matter. The authenticator component 102 can comprise the voice verification component 118, analyzer component 120, voice print repository 122, fraud detector component 136, voice resemblance scoring component 202, multilingual challenge component 204, data store 206, AI component 214, voice print generator component 216, and audio signal repository 218, such as more fully described herein.

The analyzer component 120 can comprise a voice recognition component 302 that can utilize voice or speech recognition techniques to determine or identify characteristics associated with a voice represented by voice data presented in an audio signal to facilitate generating a voice print from the voice data or comparing the characteristics associated with the voice to voice prints (e.g., designated voice print or previous voice prints associated with a user account 104). In some embodiments, the voice recognition component 302 can work in conjunction with the AI component 214 to utilize AI, machine learning, or neural network techniques or algorithms to perform voice or speech recognition on voice data presented in an audio signal to determine the characteristics associated with the voice represented by the voice data.

The voice verification component 118 also can comprise a threshold component 304 that can be utilized to determine, set, or adjust (e.g., modify) respective threshold values relating to the authentication and verification process, in accordance with the defined authentication criteria. For example, the threshold component 304 can be utilized to determine, set, or adjust a first threshold voice resemblance score that can be used for the first level of the authentication and verification process, a second threshold voice resemblance score that can be used for the second level of the authentication and verification process, or another threshold voice resemblance score that can be used for the third level (e.g., multilingual challenge level) of the authentication and verification process. As another example, the threshold component 304 can be utilized to determine, set, or adjust a threshold number of previous voice prints that can be employed to manage the number of previous voice prints stored in a file in the voice print repository 122, wherein the file can be associated with a user account 104 of a user.

In certain embodiments, the voice verification component 118 can comprise a search engine 306 that can perform searches of information stored in the data store 206 to facilitate performing the authentication and verification process during interactions with unidentified users (e.g., unidentified user 114). For example, during an interaction where the authentication and verification process can be performed to attempt to verify the identity of an unidentified user 114 attempting to access a user account 104 of a user, the search engine 306 can search (e.g., quickly and efficiently search) previous voice prints (e.g., 124, 126, and/or 128) stored in the voice data to identify one or more previous voice prints stored in the voice print repository 122 that potentially can match or relate to voice data presented by the unidentified user 114 during the current interaction and retrieve the one or more previous voice prints from the voice print repository 122 for analysis, such as described herein. The search engine 306 can search the previous voice prints (e.g., 124, 126, and/or 128) stored in the voice print repository 122 for one or more desired previous voice prints based at least in part on the user account 104 associated with the interaction (e.g., the user account 104 that the unidentified user 114 is attempting to access) or an initial analysis of a set of characteristics associated with the voice data received during the interaction as compared against the respective sets of characteristics of respective previous voice prints stored in the voice print repository 122. The previous voice prints (as generated by the voice print generator component 216) can be in a desirable (e.g., suitable, efficient, or optimal) format that can enable the search engine 306 to quickly and efficiently search the voice print repository 122 to identify and retrieve one or more desired previous voice prints. This can enable the voice verification component 118 to desirably (e.g., quickly and efficiently) perform one or more passes (e.g., attempts) to detect or determine a voice match to a user or a fraudulent voice representation during an interaction with an unidentified user 114.

In some embodiments, the authenticator component 102 can comprise an operations manager component 308 that can control (e.g., manage) operations associated with the authenticator component 102. For example, the operations manager component 308 can facilitate generating instructions to have components (e.g., voice verification component 118, data store 206, voice print generator component 216, processor component 310, and/or other component) of or associated with the authenticator component 102 perform operations, and can communicate respective instructions to such respective components of or associated with the authenticator component 102 to facilitate performance of operations by the respective components of or associated with the authenticator component 102 based at least in part on the instructions, in accordance with the defined authentication criteria and the defined authentication-related algorithm(s) (e.g., authentication and verification algorithms, AI, machine learning, and/or neural network algorithms, or other algorithms, as disclosed, defined, recited, or indicated herein by the methods, systems, and techniques described herein). The operations manager component 308 also can facilitate controlling data flow between the respective components of the authenticator component 102 and controlling data flow between the authenticator component 102 and another component(s) or device(s) (e.g., devices or components, such as a communication device, a network device, or other component or device) associated with (e.g., connected to) the authenticator component 102.

The authenticator component 102 also can comprise a processor component 310 that can work in conjunction with the other components (e.g., voice verification component 118, data store 206, voice print generator component 216, and/or other component) to facilitate performing the various functions of the authenticator component 102. The processor component 310 can employ one or more processors, microprocessors, or controllers that can process data, such as information relating to audio signals, voices, voice data, voice prints, voice recognition, characteristics associated with voices, voice resemblance scores, threshold voice resemblance scores, authentication of users, voice or other biometric information verification, multilingual challenges, various languages, fraud detection, voice replay detection, voice emulation detection, users, user accounts, user profile information, transactions, applications, services, entities, identifiers or authentication credentials associated with users or communication devices, parameters, traffic flows, policies, defined authentication criteria, algorithms (e.g., authentication and verification algorithms, AI, machine learning, and/or neural network algorithms, or other algorithms, including as one or more of these algorithms are expressed in the form of the methods and techniques described herein), protocols, interfaces, tools, and/or other information, to facilitate operation of the authenticator component 102, as more fully disclosed herein, and control data flow between the authenticator component 102 and other components (e.g., a communication device, a base station or other network component or device of the communication network, data sources, applications, or other component or device) associated with the authenticator component 102.

With further regard to the data store 206, the data store 206 can store data structures (e.g., user data, metadata), code structure(s) (e.g., modules, objects, hashes, classes, procedures) or instructions, information relating to audio signals, voices, voice data, voice prints, voice recognition, characteristics associated with voices, voice resemblance scores, threshold voice resemblance scores, authentication of users, voice or other biometric information verification, multilingual challenges, various languages, fraud detection, voice replay detection, voice emulation detection, users, user accounts, user profile information, transactions, applications, services, entities, identifiers or authentication credentials associated with users or communication devices, parameters, traffic flows, policies, defined authentication criteria, algorithms (e.g., authentication and verification algorithms, AI, machine learning, and/or neural network algorithms, or other algorithms, including as one or more of these algorithms are expressed in the form of the methods and techniques described herein), protocols, interfaces, tools, and/or other information, to facilitate controlling operations associated with the authenticator component 102. In an aspect, the processor component 310 can be functionally coupled (e.g., through a memory bus) to the data store 206 in order to store and retrieve information desired to operate and/or confer functionality, at least in part, to the voice verification component 118, data store 206, voice print generator component 216, operations manager component 308, processor component 310, and/or other component, and/or substantially any other operational aspects of the authenticator component 102.

The disclosed subject matter, by employing the authenticator component 102 and the authentication and verification techniques described herein, can enhance (e.g., improve or increase) detection of fraudulent or malicious attempts to authenticate with regard to user accounts, including desirably (e.g., accurately, reliably, efficiently, suitably, and/or optimally) detecting fraudulent or malicious attempts to use an artificially created voice or replay the voice of a user, as compared to conventional techniques for voice authentication. The disclosed subject matter, by employing the authenticator component 102 and the authentication and verification techniques described herein, can desirably inhibit (e.g., mitigate or prevent) the re-using or replaying of recordings of voices of users to attempt to authenticate with regard to user accounts associated with the system. The disclosed subject matter, by employing the authenticator component 102 and the authentication and verification techniques described herein, also can enhance security of user accounts, information associated with user accounts and users, and the system itself.

Figure 4:
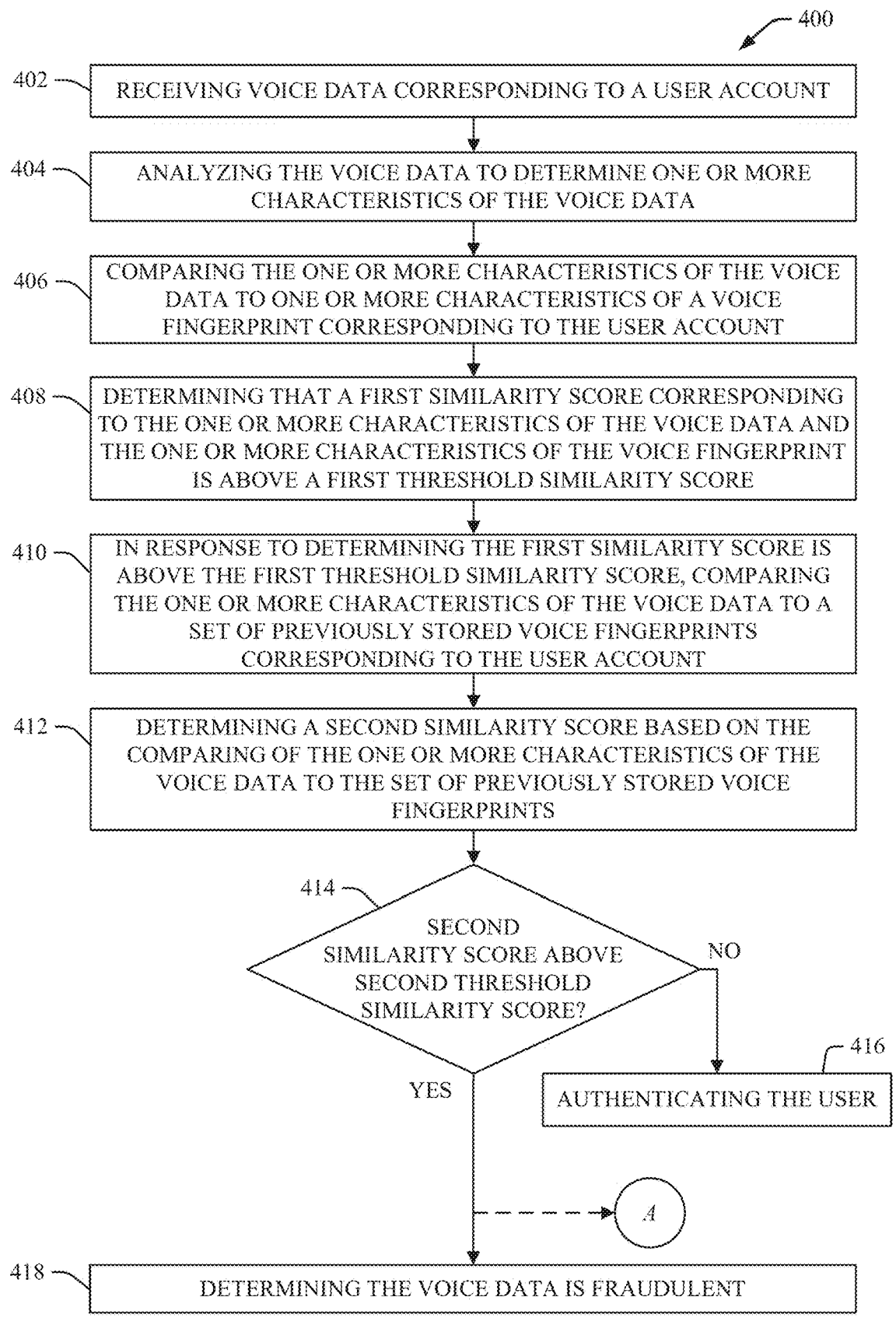
FIG. 4 depicts a flow diagram of an example, non-limiting method that can desirably perform authentication of voice information representative of a voice presented by an unidentified user to determine whether the voice information is a valid representation of the voice of a user associated with a user account or is a fraudulent representation of the voice of the user, in accordance with various aspects and embodiments described herein.
Figure 5:
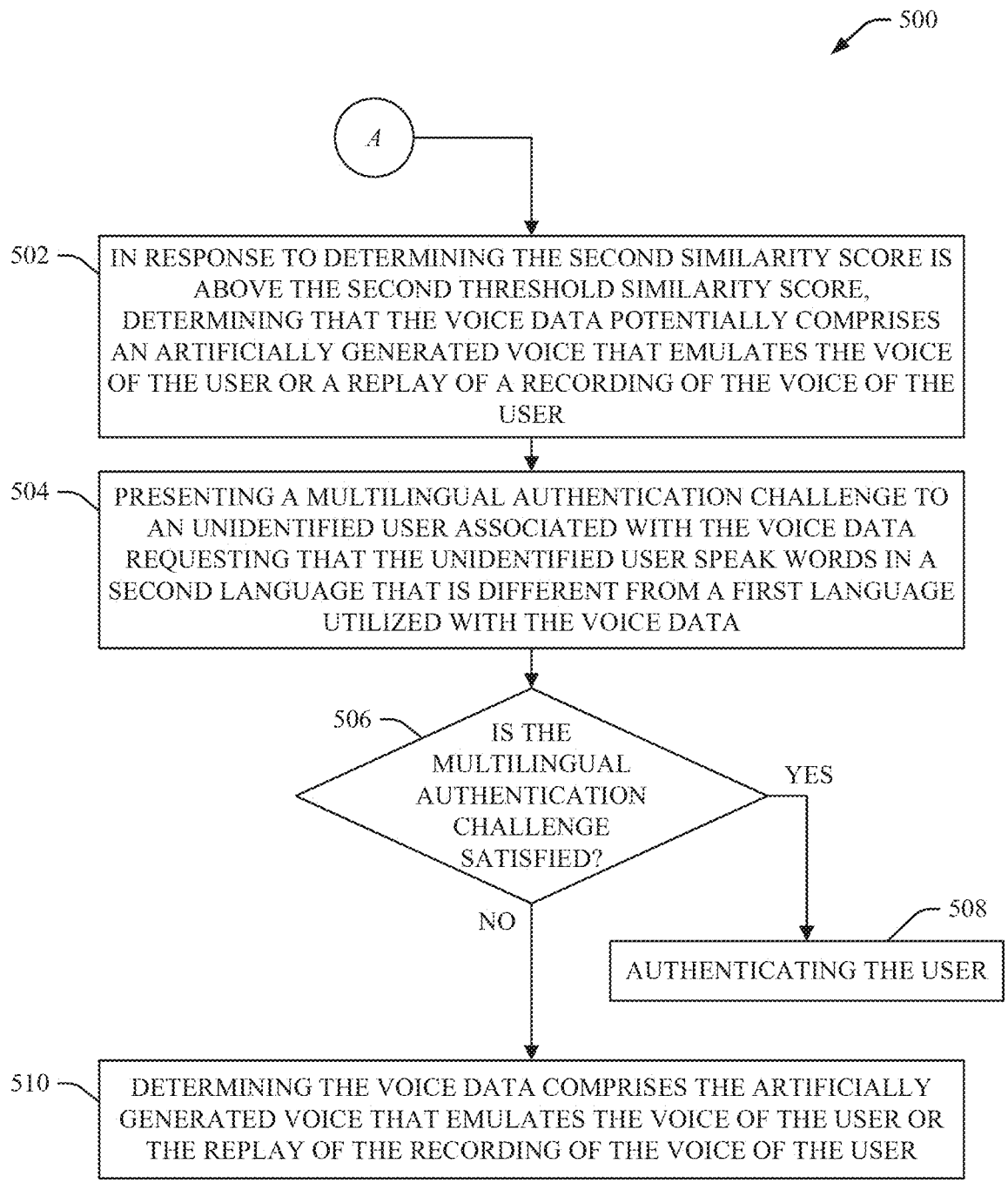
FIG. 5 illustrates a flow diagram of an example, non-limiting method that can perform a second-level multilingual authentication of voice information representative of a voice of an unidentified user to facilitate determining whether the voice information is a valid representation of the voice of a user associated with a user account or is a fraudulent representation of the voice of the user, in accordance with various aspects and embodiments described herein.

In view of the example systems and/or devices described herein, example methods that can be implemented in accordance with the disclosed subject matter can be further appreciated with reference to flowcharts in FIGS. 4-5. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 4 depicts a flow diagram of an example, non-limiting method 400 that can desirably (e.g., efficiently or optimally) perform authentication of voice information representative of a voice presented by an unidentified user to determine whether the voice information is a valid representation of the voice of a user associated with a user account or is a fraudulent representation of the voice of the user, in accordance with various aspects and embodiments described herein. The method 400 can be employed by, for example, a system comprising the authenticator component, a processor component (e.g., of or associated with the authenticator component), and/or a data store (e.g., of or associated with the authenticator component).

At 402, voice data that can correspond to a user account can be received. The authenticator component can receive voice data (e.g., an audio signal comprising the voice data) that can correspond to the user account associated with a user. The voice data can represent a voice of an unverified (e.g., unidentified, unknown, or undetermined) user, which may or may not be the user attempting to authenticate with regard to the user account, or may be an adversarial (e.g., fraudulent or malicious) user attempting to improperly gain access to the user account of the user or services or products related to the user account.

At 404, the voice data can be analyzed to determine one or more characteristics of the voice data. The authenticator component can comprise a voice verification component that can analyze the voice data to determine the one or more characteristics of the voice data.

At 406, the one or more characteristics of the voice data can be compared to one or more characteristics of a voice fingerprint corresponding to the user account. The voice verification component can compare the one or more characteristics of the voice data to one or more characteristics of a voice fingerprint (e.g., a designated voice print) corresponding to the user account. In some embodiments, the voice fingerprint can be a golden voice fingerprint that can be determined by the authenticator component to be a desirable (e.g., suitable, acceptable, or optimal) representation of the characteristics of the voice of the user associated with the user account.

At 408, a first similarity score, which can correspond to the one or more characteristics of the voice data and the one or more characteristics of the voice fingerprint, can be determined to be above a first threshold similarity score. The voice verification component can determine (e.g., calculate) the first similarity score (e.g., first voice resemblance score) based at least in part on the results of comparing the one or more characteristics of the voice data to the one or more characteristics of the voice fingerprint (e.g., designated voice print) corresponding to the user account. The first threshold (e.g., threshold minimum) similarity score can indicate whether the one or more characteristics of the voice data are sufficiently close enough (e.g., are sufficiently same or similar) to the one or more characteristics of the voice fingerprint to indicate (e.g., at least provide a preliminary indication) that the voice associated with the voice data is the voice of the user associated with the user account. In some instances and embodiments, the voice verification component can determine that the first similarity score is above the first threshold similarity score, wherein the first similarity score can correspond to (e.g., can be determined based at least in part on the results of comparing) the one or more characteristics of the voice data and the one or more characteristics of the voice fingerprint, and wherein, for example, the voice verification component has determined that the one or more characteristics of the voice data are sufficiently close enough to the one or more characteristics of the voice fingerprint (e.g., to satisfy the first threshold similarity score).

At 410, in response to determining that the first similarity score is above the first threshold similarity score, the one or more characteristics of the voice data can be compared to one or more characteristics of a set of previously stored voice fingerprints that can correspond to the user account. The voice verification component can retrieve the set of previously stored voice fingerprints from the voice print repository. In response to determining that the first similarity score is above the first threshold similarity score, the voice verification component can compare the one or more characteristics of the voice data to the one or more characteristics of the set of previously stored voice fingerprints that can be associated with (e.g., can correspond to) the user account.

At 412, a second similarity score can be determined based at least in part on the comparing of the one or more characteristics of the voice data to the one or more characteristics of the set of previously stored voice fingerprints. The voice verification component can determine (e.g., calculate) the second similarity score based at least in part on the results of the comparing of the one or more characteristics of the voice data to the one or more characteristics of the set of previously stored voice fingerprints.

At 414, a determination can be made regarding whether the second similarity score is above a second threshold similarity score. The voice verification component can determine whether the second similarity score is above the second threshold similarity score based at least in part on the results of comparing the second similarity score to the second threshold similarity score. The second threshold (e.g., threshold minimum) similarity score typically can be a higher threshold value than the first threshold similarity score At 416, in response to determining that the second similarity score is not above the second threshold similarity score, the user can be authenticated. In response to determining that the second similarity score is not above the second threshold similarity score, the voice verification component can determine that the voice associated with the voice data is the voice of the user associated with the account, is not a replay of a recording of the voice of the user, and is not an artificially generated voice that emulates the voice of the user. Accordingly, the voice verification component can authenticate the user with respect to the user account and/or associated information, transactions, applications, and/or services.

At 418, in response to determining that the second similarity score is above the second threshold similarity score, the voice data can be determined to be fraudulent. In some embodiments, in response to the voice verification component determining that the second similarity score is above the second threshold (e.g., threshold minimum) similarity score, the voice verification component can determine that the voice data is fraudulent, and can deny authentication of the unidentified user that presented the voice data in an attempt to access the user account. For instance, in response to the voice verification component determining that the second similarity score is above the second threshold similarity score, the voice verification component can determine that the voice data is too close of a match to a previously stored voice fingerprint of the set of previously stored voice fingerprints, which can thereby indicate that the voice data can be a replay of a recording of the voice of the user or can be an artificially generated voice that emulates the voice of the user.

In some embodiments, as part of the second level (or another level) of authentication and verification, in addition to or as an alternative to comparing the voice data to the set of previously stored voice fingerprints associated with the user account, the voice verification component can compare the voice data to one or more voice fingerprints associated with the user account that were tagged or flagged with a failed authentication indicator, and stored in the data store (e.g., in the voice print repository stored in the data store), during one or more previous interactions between one or more unidentified users and the system or associated service entity where the authenticator component determined that the authentication attempt to authenticate with regard to the user account failed, such as more fully described herein. For instance, the voice verification component can compare the characteristics of the voice data to the characteristics of the one or more tagged or flagged voice fingerprints (e.g., tagged or flagged with a failed authentication indicator) to determine whether the characteristics of the voice data sufficiently match the characteristics of the one or more tagged or flagged voice fingerprints, wherein a match can indicate that the voice data potentially can be fraudulent. For example, based at least in part on the comparing of the characteristics of the voice data to the characteristics of the one or more tagged or flagged voice fingerprints, the voice verification component can determine a similarity score (e.g., a third similarity score) that can indicate how similar the voice data is to a tagged or flagged voice fingerprint(s). The voice verification component can compare the similarity score to a threshold similarity score (e.g., a third threshold similarity score). If the voice similarity score satisfies (e.g., meets or exceeds; or is equal to or greater than) the threshold similarity score, the voice verification component can determine that the voice data sufficiently matches the tagged or flagged voice fingerprint(s) such that the voice data can be determined to be fraudulent or at least can be determined to potentially be fraudulent. If, instead, the similarity score does not satisfy (e.g., does not meet or exceed; or is less than) the threshold similarity score, the voice verification component can determine that the voice data does not match the tagged or flagged voice fingerprint(s), and accordingly, can determine that the voice data is not fraudulent or at least can determine that there can be an indication that the voice data is not fraudulent.

Referring again to reference numeral 414, in some alternative embodiments, in response to determining that the second similarity score is above the second threshold similarity score, the method 400 can proceed to reference point A, wherein the method 500, as depicted in FIG. 5, can proceed from reference point A, as more fully described herein.

FIG. 5 illustrates a flow diagram of an example, non-limiting method 500 that can perform a second-level multilingual authentication of voice information representative of a voice of an unidentified user to facilitate determining whether the voice information is a valid representation of the voice of a user associated with a user account or is a fraudulent representation of the voice of the user, in accordance with various aspects and embodiments described herein. The method 500 can be employed by, for example, a system comprising the authenticator component, a processor component (e.g., of or associated with the authenticator component), and/or a data store (e.g., of or associated with the authenticator component). In some embodiments, the method 500 can proceed from reference point A of method 400, as depicted in FIG. 4.

At 502, in response to determining that the second similarity score is above the second threshold similarity score, a determination can be made that the voice data potentially comprises an artificially generated voice that emulates the voice of the user or a replay of a recording of the voice of the user. As described herein, the authenticator component, employing the voice verification component, can determine the second similarity score based at least in part on the results of the comparing of the one or more characteristics of the voice data to the one or more characteristics of the set of previously stored voice fingerprints. With regard to the second threshold similarity score, the second threshold similarity score can be utilized by the voice verification component to determine whether the voice data is too close of a match to a previously stored voice fingerprint of the set of previously stored voice fingerprints, which can thereby indicate that the voice data can be a replay of a recording of the voice of the user or can be an artificially generated voice that emulates the voice of the user. In response to determining that the second similarity score is above the second threshold similarity score, the voice verification component can determine that the voice data potentially comprises an artificially generated voice that emulates the voice of the user or is a replay of a recording of the voice of the user.

At 504, a multilingual authentication challenge can be presented to the unidentified user associated with the voice data to request that the entity speak words in a second language that is different from the first language utilized with the voice data. In response to determining that the voice data is potentially fraudulent (e.g., voice data potentially comprises an artificially generated voice that emulates the voice of the user or a replay of a recording of the voice of the user), the voice verification component can present a multilingual authentication challenge to the unidentified user associated with the voice data to request that the unidentified user speak words in a second language that is different from the first language utilized with the voice data. The multilingual authentication challenge can comprise generating a random or pseudo-random phrase in the second language and requesting that the unidentified user repeat the phrase in the second language, can comprise conversing (e.g., by a representative) with the unidentified user using the second language and requesting that the unidentified user converse in the second language, or can comprise another desired type of multilingual authentication challenge involving the unidentified user speaking using the second language.

At 506, a determination can be made regarding whether the multilingual challenge is satisfied based at least in on the results of the multilingual authentication challenge. The voice verification component can determine (or, in some embodiments, the representative can determine) whether the multilingual challenge is satisfied (e.g., met, or performed successfully) based at least in on the results of the multilingual authentication challenge. For instance, if the unidentified user is able to desirably (e.g., suitably or acceptably) respond to the multilingual challenge using the second language, the voice verification component can determine (or, in some embodiments, the representative can determine) that the multilingual authentication challenge is satisfied, such as more fully described herein. If the unidentified user is not able to desirably respond to the multilingual challenge using the second language, the voice verification component can determine (or, in some embodiments, the representative can determine) that the multilingual authentication challenge is not satisfied, such as more fully described herein.

At 508, in response to determining that the multilingual challenge is satisfied, the user can be authenticated. For instance, in response to determining that the multilingual challenge is satisfied, the voice verification component can determine that the voice associated with the voice data is the voice of the user associated with the account, and is not an artificially generated voice that emulates the voice of the user and is not a replay of a recording of the voice of the user. Accordingly, the voice verification component can authenticate the user with respect to the user account and/or associated information, transactions, applications, and/or services.

At 510, in response to determining that the multilingual challenge is not satisfied, it can be determined that the voice data comprises an artificially generated voice that emulates the voice of the user or a replay of a recording of the voice of the user. If, instead, the voice verification component (or, in some embodiments, the representative) determines that the multilingual challenge is not satisfied, the voice verification component (or, in some embodiments, the representative) can determine that the voice associated with the voice data is fraudulent as being an artificially generated voice that emulates the voice of the user or a replay of a recording of the voice of the user. Accordingly, the voice verification component (or, in some embodiments, the representative) can deny authentication of the unidentified user and can prevent the unidentified user from accessing the user account and/or associated information, transactions, applications, and/or services.

Figure 6:
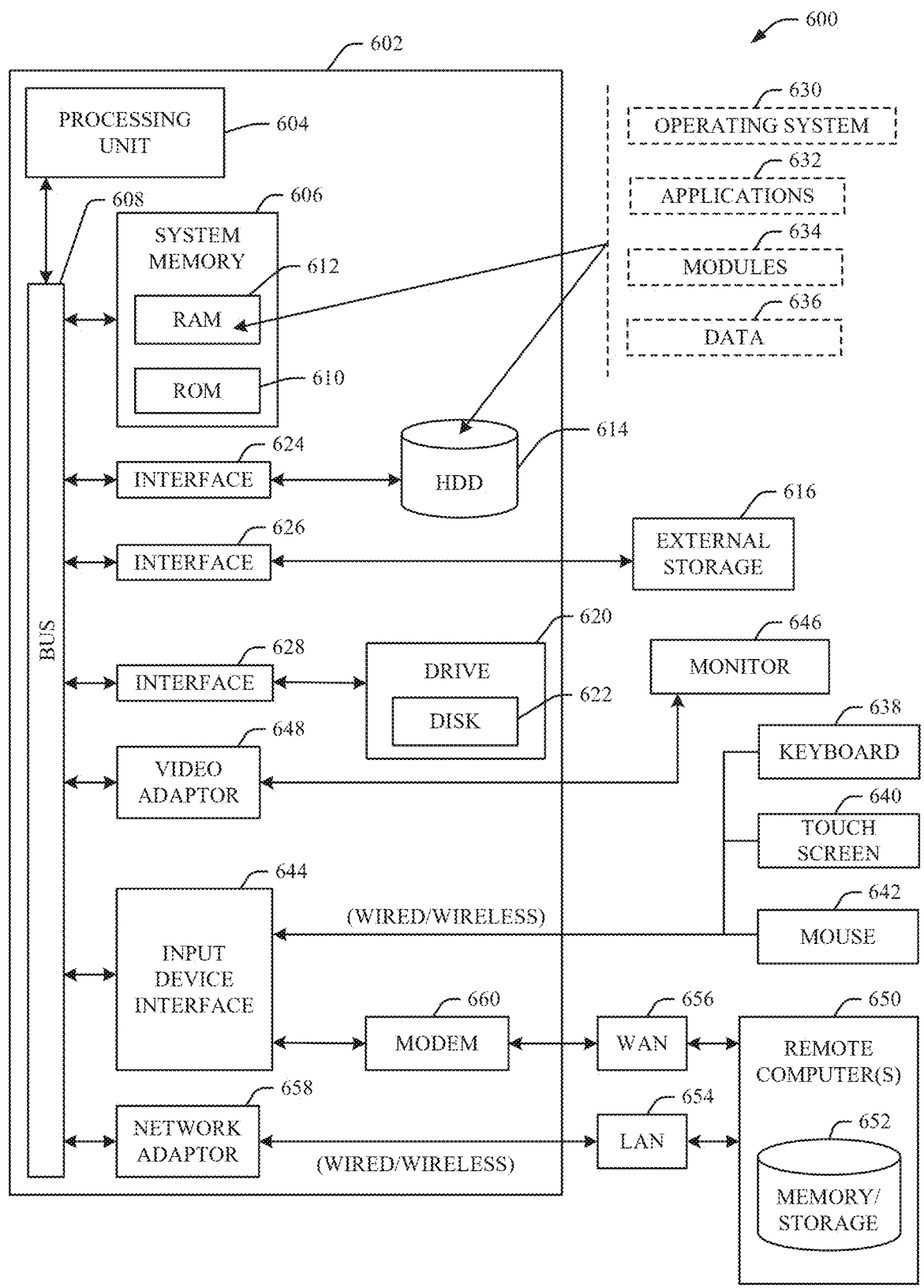
FIG. 6 illustrates a block diagram of an example, non-limiting operating environment in which one or more embodiments described herein can be facilitated.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and a drive 620, e.g., such as a solid state drive, an optical disk drive, which can read or write from a disk 622, such as a CD-ROM disc, a DVD, a BD, etc. Alternatively, where a solid state drive is involved, disk 622 would not be included, unless separate. While the internal HDD 614 is illustrated as located within the computer 602, the internal HDD 614 can also be configured for external use in a suitable chassis (not shown). Additionally, while not shown in environment 600, a solid state drive (SSD) could be used in addition to, or in place of, an HDD 614. The HDD 614, external storage device(s) 616 and drive 620 can be connected to the system bus 608 by an HDD interface 624, an external storage interface 626 and a drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above, such as but not limited to a network virtual machine providing one or more aspects of storage or processing of information. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
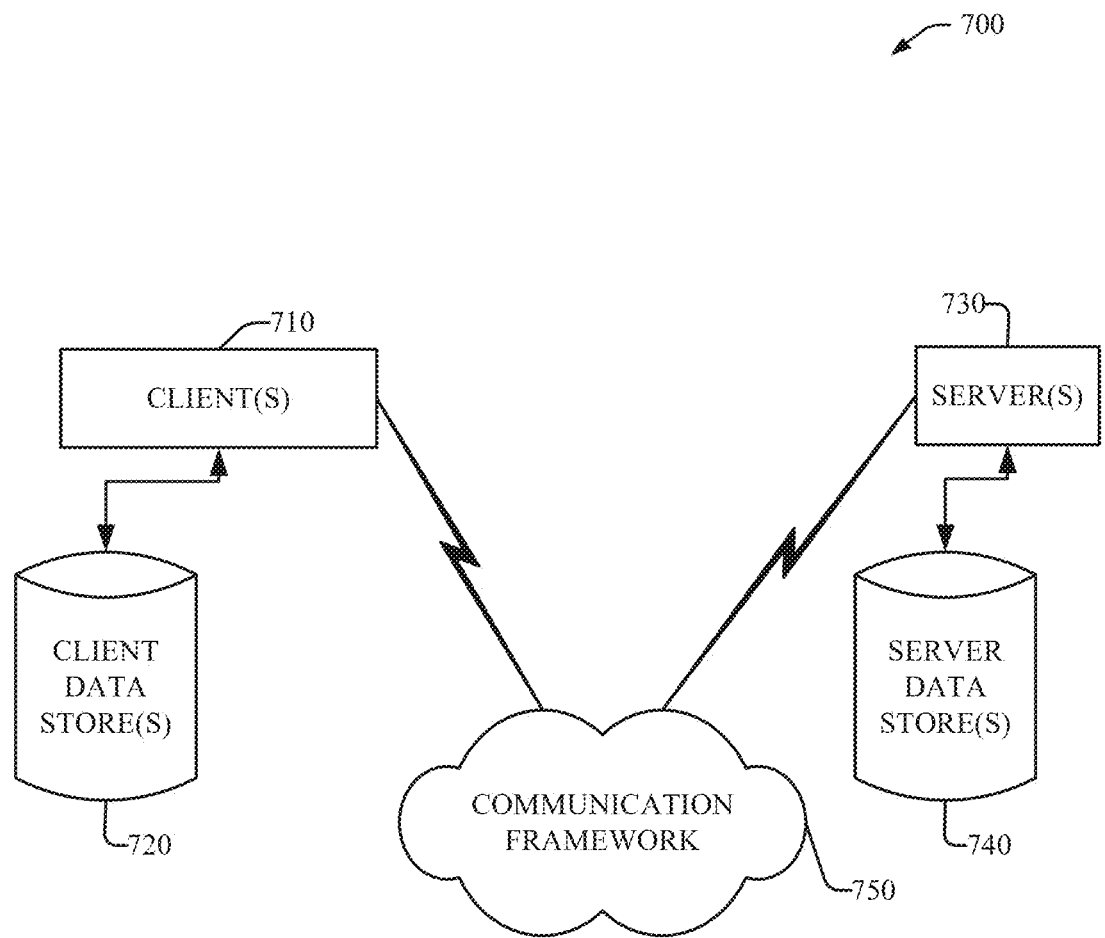
FIG. 7 illustrates an example networking environment operable to execute various implementations described herein.

FIG. 7 is a schematic block diagram of a sample computing environment 700 with which the disclosed subject matter can interact. The sample computing environment 700 includes one or more client(s) 710. The client(s) 710 can be hardware and/or software (e.g., threads, processes, computing devices). The sample computing environment 700 also includes one or more server(s) 730. The server(s) 730 can also be hardware and/or software (e.g., threads, processes, computing devices). The servers 730 can house threads to perform transformations by employing one or more embodiments as described herein, for example. One possible communication between a client 710 and a server 730 can be in the form of a data packet adapted to be transmitted between two or more computer processes. The sample computing environment 700 includes a communication framework 750 that can be employed to facilitate communications between the client(s) 710 and the server(s) 730. The client(s) 710 are operably connected to one or more client data store(s) 720 that can be employed to store information local to the client(s) 710. Similarly, the server(s) 730 are operably connected to one or more server data store(s) 740 that can be employed to store information local to the servers 730.

The disclosed subject matter can be a system, a method, an apparatus and/or a computer program product at any possible technical detail level of integration. The computer program product can include a computer readable storage medium (or media) having computer readable program instructions thereon for causing a processor to carry out aspects of the disclosed subject matter. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

It is to be appreciated and understood that components (e.g., authenticator component, voice verification component, voice print repository, multilingual challenge component, voice print generator component, artificial intelligence component, search engine, communication device, processor component, data store, or other component or device), as described with regard to a particular system or method, can include the same or similar functionality as respective components (e.g., respectively named components or similarly named components) as described with regard to other systems or methods disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more computer-readable memories storing program instructions; and
one or more processors configured to execute the program instructions to cause the system to perform operations comprising:
receiving voice information in connection with a user account;
determining one or more attributes of the voice information based on analyzing the voice information;
determining a first voice resemblance score based on comparing the one or more attributes of the voice information to one or more attributes of a voice print associated with the user account;
determining that the first voice resemblance score is higher than a first threshold voice resemblance score;
in response to determining that the first voice resemblance score is above the first threshold voice resemblance score, comparing the one or more attributes of the voice information to one or more attributes of a set of previously stored voice prints associated with the user account, wherein the set of previously stored voice prints is different from the voice print, and wherein the set of previously stored voice prints relate to one or more interactions between the system and a user associated with the user account;
determining a second voice resemblance score based on the comparing of the one or more attributes of the voice information to the one or more attributes of the set of previously stored voice prints;
determining whether the second voice resemblance score is higher than a second threshold voice resemblance score; and
in response to determining that the voice information is potentially invalid or fraudulent, presenting an authentication challenge comprising a request in a second language different from a first language to which the voice information is related.

2. The system of claim 1, wherein the operations further comprise:
in response to determining that the second voice resemblance score is higher than the second threshold voice resemblance score, determining that the voice information is not valid; and
in response to determining that the voice information is not valid, tagging the voice information as not valid.

3. The system of claim 2, wherein the tagging of the voice information as not valid comprises tagging the voice information as being a replay of a recording of a voice of the user or an artificially generated voice that emulates the voice of the user.

4. The system of claim 1, wherein the operations further comprise:
in response to determining that the second voice resemblance score is higher than the second threshold voice resemblance score, determining that the voice information potentially is not valid; and
in response to determining that the voice information potentially is not valid, presenting an authentication challenge to an unidentified user that presented the voice information, wherein the unidentified user is the user associated with the user account or a fraudulent user.

5. The system of claim 4, wherein the voice information is first voice information, wherein the authentication challenge relates to multi-language verification, wherein the presenting of the authentication challenge comprises requesting that the unidentified user present second voice information comprising words spoken in a second language that is different from a first language utilized with the first voice information, and wherein the operations further comprise:
in response to receiving the second voice information, determining whether the second voice information comprises the words spoken in the second language that satisfy a defined language criterion, based on an analysis of the second voice information; and
one of:
in response to determining that the second voice information does not comprise the words spoken in the second language that satisfy the defined language criterion, determining that the voice information is not valid, and
declining to authenticate the unidentified user; or
in response to determining that the second voice information comprises the words spoken in the second language that satisfy the defined language criterion, determining that the voice information is verified as being a voice of the user and is not an artificially generated voice that emulates the voice of the user or a replay of a recording of the voice of the user, and
in response to determining that the voice information is verified as being a voice of the user, authenticating the user.

6. The system of claim 5, wherein the operations further comprise:
selecting the second language for the authentication challenge based on user profile information associated with the user that indicates that the user is capable of speaking the second language.

7. The system of claim 1, wherein the operations further comprise:
in response to determining that the second voice resemblance score is not higher than the defined second threshold voice resemblance score, determining that the voice information is verified as being a voice of the user and is not an artificially generated voice that emulates the voice of the user or a replay of a recording of the voice of the user; and
in response to determining that the voice information is verified as being the voice of the user, authenticating the user.

8. The system of claim 7, wherein the voice print is a first voice print, and wherein the operations further comprise:
in response to authenticating the user, determining a second voice print based on the voice information, wherein the second voice print comprises the one or more attributes of the voice information; and
updating the set of previously stored voice prints to comprise the second voice print.

9. The system of claim 1, wherein the set of previously stored voice prints relates to previous interactions between the user and the system that occurred within a prior threshold amount of time before a time of an interaction comprising the voice information, and wherein the operations further comprise:

in response to determining that a previously stored voice print of the set of previously stored voice prints occurred before the prior threshold amount of time, removing the previously stored voice print from the set of previously stored voice prints.

10. The system of claim 1, wherein the computer-executable components further comprise:

storing the set of previously stored voice prints associated with the user and other sets of previously stored voice prints associated with other users in a voice print repository;

in response to receiving the voice information, searching the voice print repository based on the voice information; and based on the searching, retrieving the set of previously stored voice prints from the voice print repository.

11. The system of claim 1, wherein the operations further comprise:

storing previous audio signals comprising the voice of the user and other previous audio signals comprising other voices of other users in an audio signal repository, wherein the previous audio signals comprise previous voice information previously authenticated as comprising a voice of the user.

12. The system of claim 1, wherein the operations further comprise:

performing an artificial intelligence analysis on at least one of the voice information, the set of previously stored voice prints, or a set of previously stored voice information that corresponds to the set of previously stored voice prints, to facilitate determining whether an unidentified user associated with the voice information is to be authenticated based on the voice information, wherein the artificial intelligence analysis is performed utilizing at least one voice recognition technique relating to at least one of frequency estimation, a hidden Markov model, a Gaussian mixture model, a pattern matching algorithm, a neural network, a matrix representation, a vector quantization, a decision tree, or a cosine similarity technique.

13. A computer-implemented method, comprising:

receiving, by a system having a processor and a memory, voice data corresponding to a user account;

analyzing, by the system, the voice data to determine one or more characteristics of the voice data;

comparing, by the system, the one or more characteristics of the voice data to one or more characteristics of a voice fingerprint corresponding to the user account;

determining, by the system, that a first similarity score corresponding to the one or more characteristics of the voice data and the one or more characteristics of the voice fingerprint is above a first threshold similarity score;

in response to determining that the first similarity score corresponding to the one or more characteristics of the voice data and the one or more characteristics of the voice fingerprint is above the first threshold similarity score, comparing, by the system, the one or more characteristics of the voice data to a set of previously stored voice fingerprints corresponding to the user account, wherein the set of previously stored voice fingerprints is different from the voice fingerprint, and wherein the set of previously stored voice fingerprints correspond to one or more interactions between the system and a user corresponding to the user account;

determining, by the system, whether a second similarity score corresponding to the one or more characteristics of the voice data and the set of previously stored voice fingerprints is above a second threshold similarity score; and in response to determining that the voice information is potentially invalid or fraudulent, presenting an authentication challenge comprising a request in a second language different from a first language to which the voice information is related.

14. The computer-implemented method of claim 13, further comprising:

in response to determining that the second similarity score corresponding to the one or more characteristics of the voice data and the set of previously stored voice fingerprints is above the second threshold similarity score, determining, by the system, that the voice data is fraudulent; and flagging, by the system, the voice data as fraudulent.

15. The computer-implemented method of claim 14, wherein the flagging the voice data as fraudulent comprises flagging the voice data as being an artificially created voice that imitates the voice of the user or a replay of a recording of a voice of the user.

16. The computer-implemented method of claim 13, further comprising:

in response to determining that the second similarity score corresponding to the one or more characteristics of the voice data and the set of previously stored voice fingerprints is not above the second threshold similarity score, determining, by the system, that the voice data is verified as being a voice of the user and is not an artificially created voice that imitates the voice of the user or a replay of a recording of the voice of the user; and in response to determining that the voice data is verified as being the voice of the user, authenticating, by the system, the user.

17. The computer-implemented method of claim 16, wherein the voice fingerprint is a first voice fingerprint, and wherein the method further comprises:

in response to authenticating the user, generating, by the system, a second voice fingerprint based on the voice data, wherein the second voice fingerprint comprises the one or more characteristics of the voice data; and updating, by the system, the set of previously stored voice fingerprints to comprise the second voice fingerprint.

18. The computer-implemented method of claim 13, wherein the set of previously stored voice fingerprints corresponds to previous interactions between the user and the system that occurred within a prior threshold amount of time, and wherein the method further comprises:

in response to determining that a previously stored voice fingerprint of the set of previously stored voice fingerprints occurred prior to the prior threshold amount of time, deleting, by the system, the previously stored voice fingerprint from the set of previously stored voice fingerprints.

19. A non-transitory machine-readable medium, comprising executable instructions that, when executed by a processor, facilitate performance of operations, comprising:

receiving voice information associated with a user account;

determining one or more characteristics of the voice information based on the analyzing of the voice information;

determining a first voice likeness score based on comparing the one or more characteristics of the voice information to one or more characteristics of a voice print associated with the user account;

determining that the first voice likeness score is greater than a first threshold voice likeness score based on comparing the first voice likeness score to the first threshold voice likeness score;

in response to determining that the first voice likeness score is above the first threshold voice likeness score, comparing the one or more characteristics of the voice information to one or more characteristics of a set of previously stored voice prints associated with the user account, wherein the set of previously stored voice prints is different from the voice print, and wherein the set of previously stored voice prints relate to one or more interactions between the system and a user associated with the user account;

determining a second voice likeness score based on the comparing of the one or more characteristics of the voice information to the one or more characteristics of the set of previously stored voice prints; and determining whether the second voice likeness score is greater than a second threshold voice likeness score; and in response to determining that the voice information is potentially invalid or fraudulent, presenting an authentication challenge comprising a request in a second language different from a first language to which the voice information is related.

20. The non-transitory machine-readable medium of claim 19, wherein the operations further comprise:

in response to determining that the second voice likeness score is greater than the second threshold voice likeness score, determining that there is at least an indication that the voice information comprises a synthesized voice that emulates a voice of the user or is a replay of a recording of the voice of the user; or in response to determining that the second voice likeness score is not greater than the second threshold voice likeness score, determining that there is an indication that the voice information is the voice of the user and not the replay of the recording of the voice of the user.

* * * * *